(12) United States Patent
Addison et al.

(10) Patent No.: US 12,514,570 B2
(45) Date of Patent: Jan. 6, 2026

(54) BIOPSY TRACT SEALANT APPLICATOR DEVICE AND BIOPSY SYSTEM

(71) Applicant: C.R. Bard, Inc., Franklin Lakes, NJ (US)

(72) Inventors: Jordan Addison, Chandler, AZ (US); Alexander Palmer, Scottsdale, AZ (US)

(73) Assignee: C.R. Bard, Inc., Franklin Lakes, NJ (US)

( * ) Notice: Subject to any disclaimer, the term of this patent is extended or adjusted under 35 U.S.C. 154(b) by 1204 days.

(21) Appl. No.: 17/424,764

(22) PCT Filed: Jan. 27, 2020

(86) PCT No.: PCT/US2020/015194
§ 371 (c)(1),
(2) Date: Jul. 21, 2021

(87) PCT Pub. No.: WO2020/159862
PCT Pub. Date: Aug. 6, 2020

(65) Prior Publication Data
US 2022/0117589 A1 Apr. 21, 2022

Related U.S. Application Data

(60) Provisional application No. 62/798,151, filed on Jan. 29, 2019.

(51) Int. Cl.
*A61B 10/02* (2006.01)
*A61B 17/00* (2006.01)

(52) U.S. Cl.
CPC .... *A61B 10/0233* (2013.01); *A61B 17/00491* (2013.01); *A61B 17/0057* (2013.01);
(Continued)

(58) Field of Classification Search
CPC ........ A61B 2010/0208; A61B 10/0233; A61B 2017/00367; A61B 17/00491;
(Continued)

(56) References Cited

U.S. PATENT DOCUMENTS 5,383,899 A 1/1995 Hammerslag
6,475,182 B1 11/2002 Hnojewyj et al.
(Continued)

FOREIGN PATENT DOCUMENTS

CN 1754514 A 4/2006
JP 2003534037 A 11/2003
(Continued)

OTHER PUBLICATIONS

Japanese Office Action dated Feb. 2, 2024 pertaining to Japanese application No. 2021544143 filed Jan. 27, 2020, pp. 1-4.
(Continued)

*Primary Examiner* — Jennifer Robertson
(74) *Attorney, Agent, or Firm* — Dinsmore & Shohl LLP

(57) ABSTRACT

A biopsy tract sealant applicator device includes a housing and a syringe having a body that is configured to move in an interior chamber of the housing between an extended position and a retracted position. The body is configured for connection to a biopsy cannula. A plunger of the syringe has a piston configured to move in a cylinder of the syringe between a proximal position and a distal position. The spring unit is coupled to the body of the syringe and to the housing. A gear train is operatively coupled to each of the housing, the body of the syringe, and the plunger of the syringe. The gear train is configured to move the plunger of the syringe from the proximal position toward the distal position as the body is moved from the extended position toward the retracted position by a biasing force exerted by the spring unit.

20 Claims, 12 Drawing Sheets

(52) U.S. Cl.
CPC .......... *A61B 2010/0208* (2013.01); *A61B 2017/0065* (2013.01); *A61B 2017/00654* (2013.01)

(58) Field of Classification Search
CPC ........ A61B 17/0057; A61B 2017/0065; A61B 2017/00809
See application file for complete search history.

(56) References Cited

U.S. PATENT DOCUMENTS

| | | | |
|---|---|---|---|
| 6,613,070 | B2 | 9/2003 | Redmond et al. |
| 6,702,760 | B2 * | 3/2004 | Krause ............... A61B 10/0283 |
| | | | 600/564 |
| 6,770,070 | B1 | 8/2004 | Balbierz |
| 6,840,952 | B2 | 1/2005 | Saker et al. |
| 7,618,436 | B2 | 11/2009 | Forsberg |
| 7,621,936 | B2 | 11/2009 | Cragg et al. |
| 8,314,211 | B2 | 11/2012 | Falus |
| 8,317,824 | B2 | 11/2012 | Jenson et al. |
| 2002/0091411 | A1 | 7/2002 | Saker et al. |
| 2003/0009194 | A1 | 1/2003 | Saker et al. |
| 2005/0228309 | A1 | 10/2005 | Fisher et al. |
| 2006/0041243 | A1 | 2/2006 | Nayak et al. |
| 2006/0074343 | A1 | 4/2006 | Hibner |
| 2006/0200040 | A1 | 9/2006 | Weikel et al. |
| 2007/0032741 | A1 | 2/2007 | Hibner et al. |
| 2011/0245866 | A1 * | 10/2011 | Cassingham .... A61B 17/00491 |
| | | | 606/213 |
| 2011/0282270 | A1 | 11/2011 | Hall et al. |
| 2014/0025103 | A1 | 1/2014 | Hundertmark et al. |
| 2016/0120528 | A1 | 5/2016 | Abtin |
| 2017/0055966 | A1 | 3/2017 | Vetter et al. |
| 2017/0209131 | A1 * | 7/2017 | Penner ............... A61B 17/0057 |
| 2017/0245863 | A1 | 8/2017 | Weber et al. |
| 2020/0390427 | A1 * | 12/2020 | Eisenthal ........... A61B 10/0233 |

FOREIGN PATENT DOCUMENTS

| | | |
|---|---|---|
| JP | 2015512703 A | 4/2015 |
| WO | 0170114 A1 | 9/2001 |
| WO | 2005092204 A2 | 10/2005 |
| WO | 2010065736 A2 | 6/2010 |
| WO | 2013142515 A1 | 9/2013 |

OTHER PUBLICATIONS

Chinese First Office Action and Search Report dated Nov. 19, 2023, pertaining to Chinese patent application 202080019603.X.

* cited by examiner

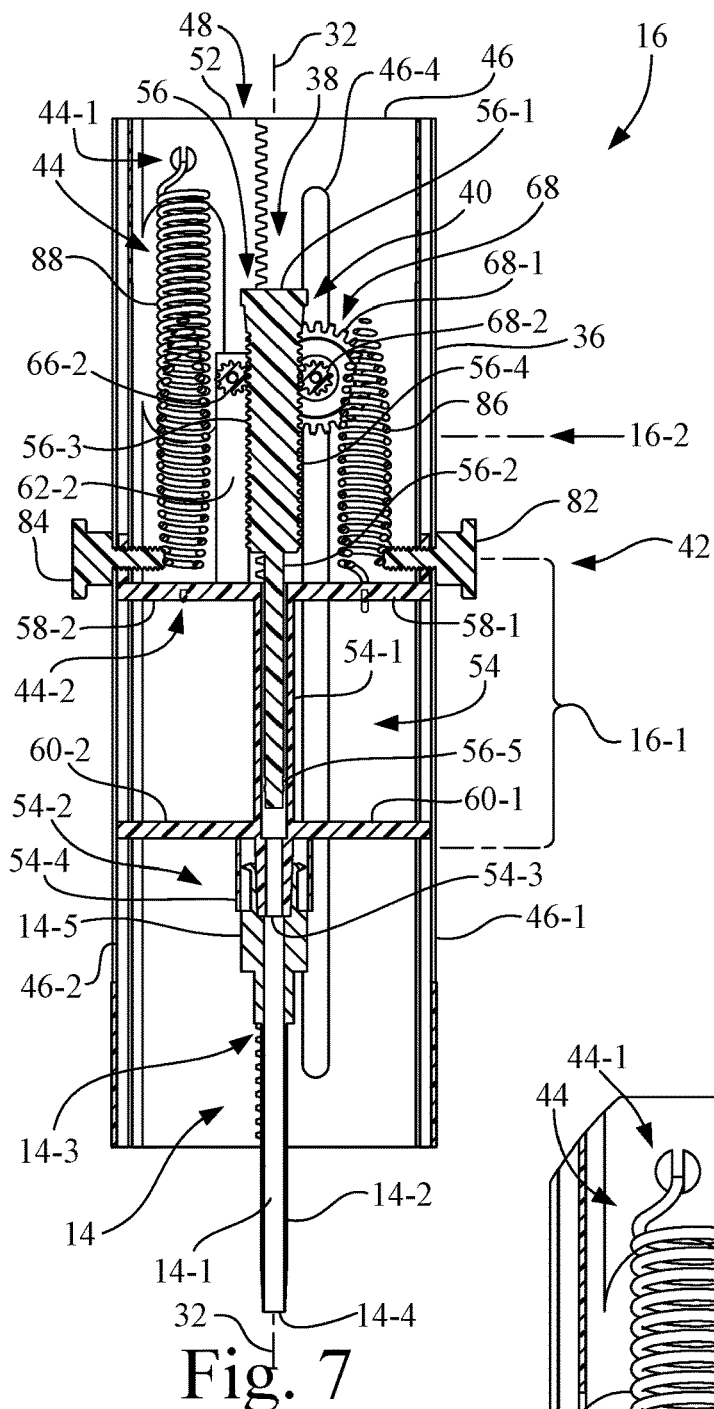
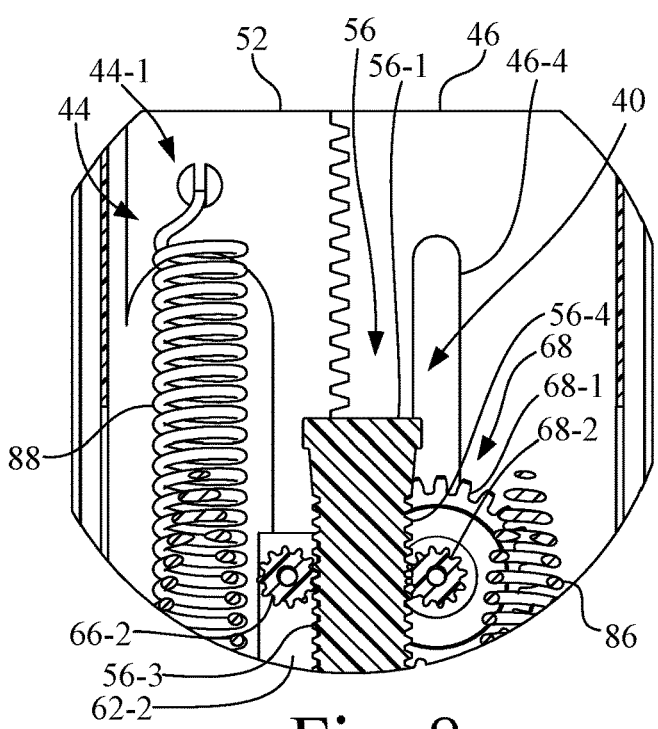
Fig. 7
Fig. 8

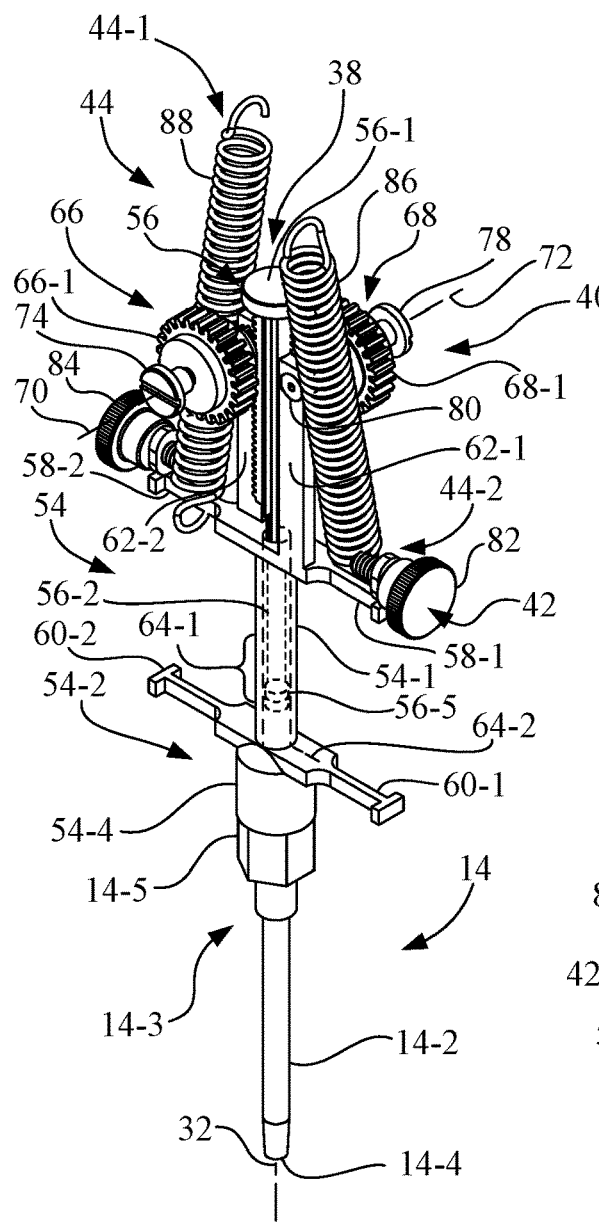
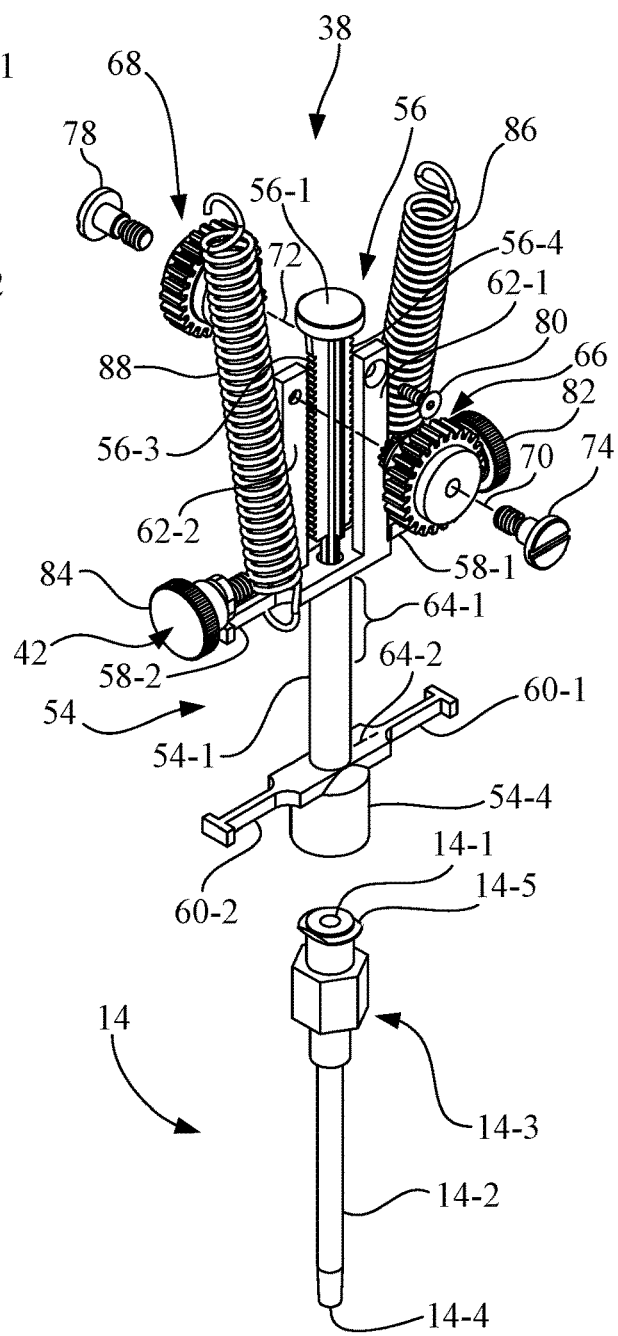
Fig. 9
Fig. 10

BIOPSY TRACT SEALANT APPLICATOR DEVICE AND BIOPSY SYSTEM

CROSS-REFERENCE TO RELATED APPLICATIONS

This application is a U.S. National Phase of PCT/US2020/015194, entitled "BIOPSY TRACT SEALANT APPLICATOR DEVICE AND BIOPSY SYSTEM" and filed Jan. 27, 2020, which claims priority to U.S. provisional patent application Ser. No. 62/798,151 entitled "BIOPSY TRACT SEALANT APPLICATOR DEVICE", filed Jan. 29, 2019, each of which are incorporated herein by reference in their respective entireties.

TECHNICAL FIELD

The present invention relates to an auxiliary device for use in a biopsy procedure, and, more particularly, is directed to a biopsy tract sealant applicator device.

BACKGROUND ART

Pneumothorax and, more so, pneumothorax requiring chest tube placement, are significant concerns for clinicians performing and the patients undergoing percutaneous lung biopsies. The incidence of pneumothorax in patients undergoing transthoracic needle biopsy (TTNB) has been reported to be from 9 percent to 54 percent, with an average of around 20 percent. Up to 17 percent of pneumothoraces are large enough to require chest tube placement. Of those patients that develop a pneumothorax, 5 percent to 18 percent require chest tube placement.

It is believed that the incidence of pneumothorax is essentially the same for single-needle fine needle aspiration (FNA), coaxial-needle FNA, and core biopsy using automated biopsy devices. Factors increasing the risk of pneumothorax include increased patient age, obstructive lung disease, increased depth of lesion, multiple pleural passes, increased time of needle across the pleura, and traversal of a fissure. Pneumothoraces can occur during or immediately after the procedure, which is why it is important to perform a CT scan of the region following removal of the needle. Other less common complications of TTNB include hemoptysis (coughing up blood), hemothorax (a type of pleural effusion in which blood accumulates in the pleural cavity), infection, and air embolism.

Some suggest that approximately 30% of lung biopsies result in some form of pneumothorax that makes deploying a plug to plug the tract difficult or impossible.

What is needed in the art is a biopsy tract sealant applicator device that may reduce or eliminate pneumothorax, and which may be deployed either before or after a pneumothorax occurs.

SUMMARY OF INVENTION

The present invention provides a biopsy tract sealant applicator device that may reduce or eliminate pneumothorax, and which may be deployed either before or after a pneumothorax occurs.

The invention, in one form, is directed to a biopsy tract sealant applicator device for connection to a mounting hub of a biopsy cannula. The biopsy tract sealant applicator device includes a housing, a syringe, a spring unit, and a gear train. The housing has an interior chamber. The syringe has a body and a plunger. The body is slidably coupled to the housing in the interior chamber. The body is configured to move in the interior chamber of the housing between an extended position and a retracted position. The body has a cylinder and a distal end portion that defines a delivery port and a coupler. The delivery port is in fluid communication with the cylinder. The coupler is configured for connection to the mounting hub of the biopsy cannula. The plunger has a piston positioned in the cylinder proximal to the delivery port, and is configured to move in the cylinder between a proximal position and a distal position. The spring unit has a first end and a second end. The first end is coupled to the body of the syringe and the second end is coupled to the housing. The spring unit has a charged state and a discharged state, wherein when the body is in the extended position the spring unit is in the charged state to exert a biasing force on the body of the syringe in a direction toward the retracted position. The gear train is located in the interior chamber of the housing. The gear train is operatively coupled to each of the housing, the body of the syringe, and the plunger of the syringe. The gear train is configured to move the plunger from the proximal position toward the distal position as the body is moved from the extended position toward the retracted position by the biasing force exerted by the spring unit.

The invention in another form is directed to a biopsy system that includes a biopsy cannula, a biopsy device, and a biopsy tract sealant applicator device. The biopsy cannula has a cannula lumen and a mounting hub. The biopsy device has a biopsy probe configured to be received through the cannula lumen of the biopsy cannula. The biopsy tract sealant applicator device is configured for connection to the mounting hub of the biopsy cannula after the biopsy probe is removed from the cannula lumen of the biopsy cannula. The biopsy tract sealant applicator device may be configured as described above in the previous paragraph, and may be configured as described hereinafter in more detail, wherein the gear train is configured to simultaneously move the plunger of the syringe from the proximal position toward the distal position as the body of the syringe is moved from the extended position toward the retracted position by the biasing force exerted by the spring unit.

An advantage of the present invention is that the biopsy tract sealant applicator device of the present invention may be configured to simultaneously deliver a flowable sealant material to a biopsy tract in a suitable volume and rate so as to fill the biopsy tract as the biopsy cannula is being retracted (i.e. withdrawn) from the biopsy tract, so as to aid in reducing or preventing pneumothorax.

Another advantage is that the biopsy tract sealant applicator device may be configured to aid in reducing or eliminating an over-dispensing of the flowable sealant material into the patient's anatomy, which could result in procedural complications.

Yet another advantage is that the biopsy tract sealant applicator device for delivering a flowable material, e.g., a hydrogel, to a biopsy tract is simple to use, and may require minimal training for a physician.

Still another advantage is that the biopsy tract sealant applicator device may be configured to operate such that the sealant flows out, or sprays out, of the introducer cannula by selecting a gear ratio of the gear train to select a desired rate of retraction of the introducer cannula versus the rate of depression of the sealant syringe plunger.

BRIEF DESCRIPTION OF DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIGS. 3-12 show various views of the biopsy tract sealant applicator device in the armed state depicted in FIG. 1, wherein:

FIG. 3 is a perspective view of the biopsy tract sealant applicator device of FIG. 1, coupled to the biopsy cannula of FIG. 1;

FIG. 4 is a side view of the biopsy tract sealant applicator device of FIG. 1, coupled to the biopsy cannula of FIG. 1, identifying the extended and retracted positions relative to a position of the actuator;

FIG. 5 is another side view of the biopsy tract sealant applicator device of FIG. 1, coupled to the biopsy cannula of FIG. 1, rotated 90 degrees counter clockwise from the orientation of FIG. 4, when viewed from above, identifying the extended and retracted positions relative to a position of the actuator;

FIG. 6 is a top view of the biopsy tract sealant applicator device of FIGS. 1 and 3-5;

FIG. 7 is a section view of the biopsy tract sealant applicator device of FIGS. 1 and 3-6, taken along line 7-7 of FIG. 6, showing the extended position of the syringe body relative to the housing, with respect to the extended and retracted positions identified relative to a position of the actuator;

FIG. 8 is an enlargement of a portion of the section view of the biopsy tract sealant applicator device of FIG. 7;

FIG. 9 shows the perspective view of the biopsy tract sealant applicator device of FIG. 3 with the housing removed to expose the syringe, a portion of the gear train, the actuator, and the spring unit of the biopsy tract sealant applicator device of FIGS. 1 and 3-8;

FIG. 10 is another perspective view of the biopsy tract sealant applicator device of FIG. 9, coupled to the biopsy cannula, and rotated 90 degrees counterclockwise from the orientation of FIG. 9, when viewed from above;

FIG. 11 shows the side view of the biopsy tract sealant applicator device of FIG. 5 with the housing removed to expose the syringe, the gear train, the actuator, and the spring unit of the biopsy tract sealant applicator device of FIGS. 1 and 3-10; and FIG. 12 is a side exploded view of the biopsy tract sealant applicator device of FIG. 11, coupled to the biopsy cannula, and rotated 90 degrees counterclockwise from the orientation of FIG. 11, when viewed from above.

FIGS. 13-22 show various views of the biopsy tract sealant applicator device in the deployed state depicted in FIG. 2, wherein:

FIG. 13 is a perspective view of the biopsy tract sealant applicator device of FIG. 2, coupled to the biopsy cannula of FIG. 2;

FIG. 14 is a side view of the biopsy tract sealant applicator device of FIG. 2, coupled to the biopsy cannula of FIG. 2, identifying the extended and retracted positions relative to a position of the actuator;

FIG. 15 is another side view of the biopsy tract sealant applicator device of FIG. 2, coupled to the biopsy cannula of FIG. 2, rotated 90 degrees counterclockwise from the orientation of FIG. 14, when viewed from above, identifying the extended and retracted positions relative to a position of the actuator;

FIG. 16 is a top view of the biopsy tract sealant applicator device of FIGS. 2 and 13-15;

FIG. 17 is a section view of the biopsy tract sealant applicator device of FIGS. 2 and 13-16, taken along line 17-17 of FIG. 16, showing the extended position of the syringe body relative to the housing, with respect to the extended and retracted positions identified relative to a position of the actuator;

FIG. 18 is an enlargement of a portion of the section view of the biopsy tract sealant applicator device of FIG. 17;

FIG. 19 shows the perspective view of the biopsy tract sealant applicator device of FIG. 13 with the housing removed to expose the syringe, a portion of the gear train, the actuator, and the spring unit of the biopsy tract sealant applicator device of FIGS. 2 and 13-18.

FIG. 20 is another perspective view of the biopsy tract sealant applicator device of FIG. 19, coupled to the biopsy cannula, and rotated 90 degrees counterclockwise from the orientation of FIG. 19, when viewed from above;

FIG. 21 shows the side view of the biopsy tract sealant applicator device of FIG. 15 with the housing removed to expose the syringe, the gear train, the actuator, and the spring unit of the biopsy tract sealant applicator device of FIGS. 2 and 13-20; and FIG. 22 is a side exploded view of the biopsy tract sealant applicator device of FIG. 21 with the spring unit removed, coupled to the biopsy cannula, and rotated 90 degrees counterclockwise from the orientation of FIG. 21, when viewed from above.

Corresponding reference characters indicate corresponding parts throughout the several views. The exemplifications set out herein illustrate an embodiment of the invention, and such exemplifications are not to be construed as limiting the scope of the invention in any manner.

DESCRIPTION OF EMBODIMENTS

Figure 1:
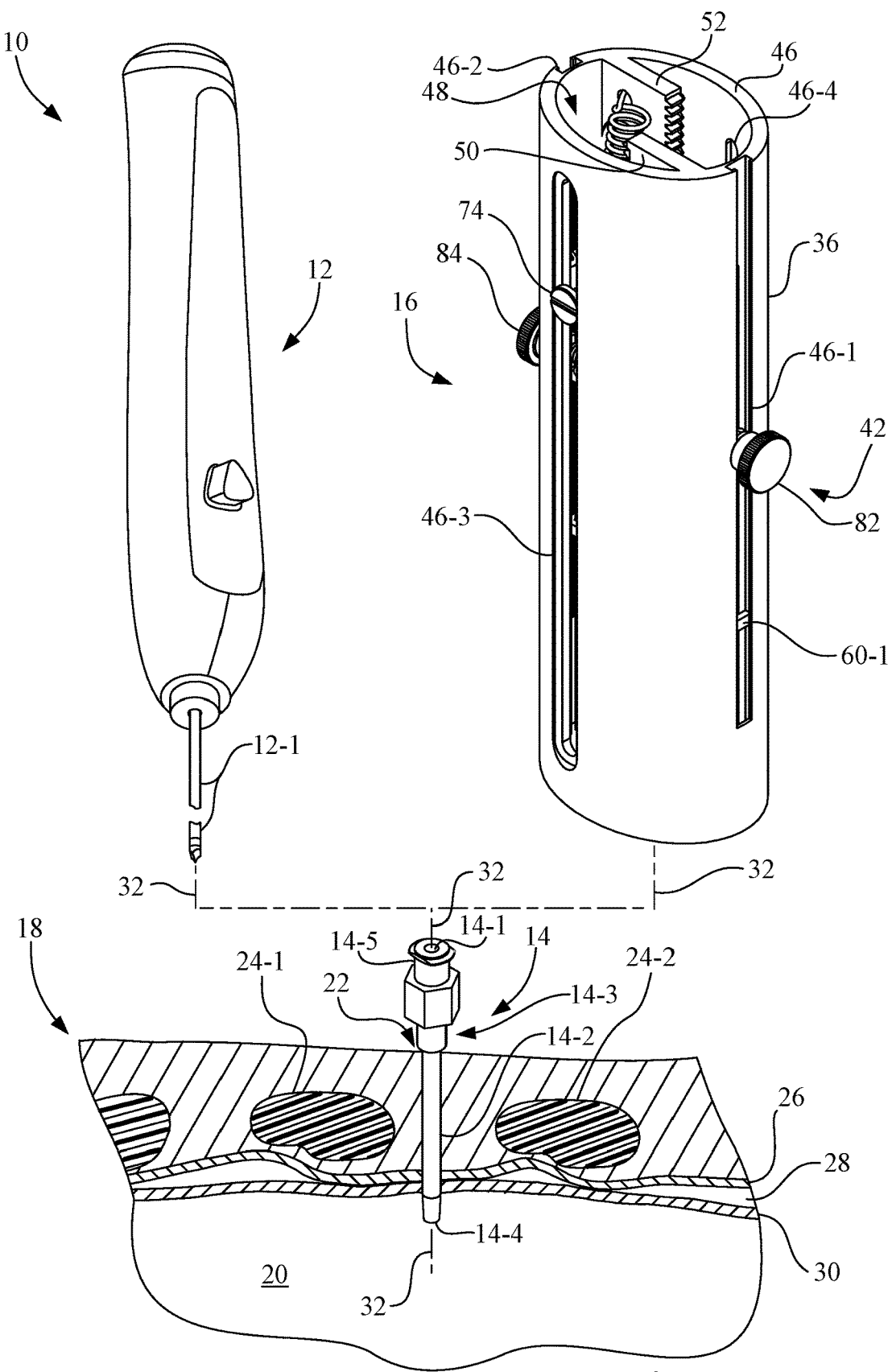
FIG. 1 is a diagrammatic representation of a biopsy system that generally includes a biopsy device, a biopsy cannula, and a biopsy tract sealant applicator device configured in accordance with an embodiment of the present invention, in conjunction with a depicted portion of a chest wall and lung of a patient, with the biopsy tract sealant applicator device in an armed state.
Figure 2:
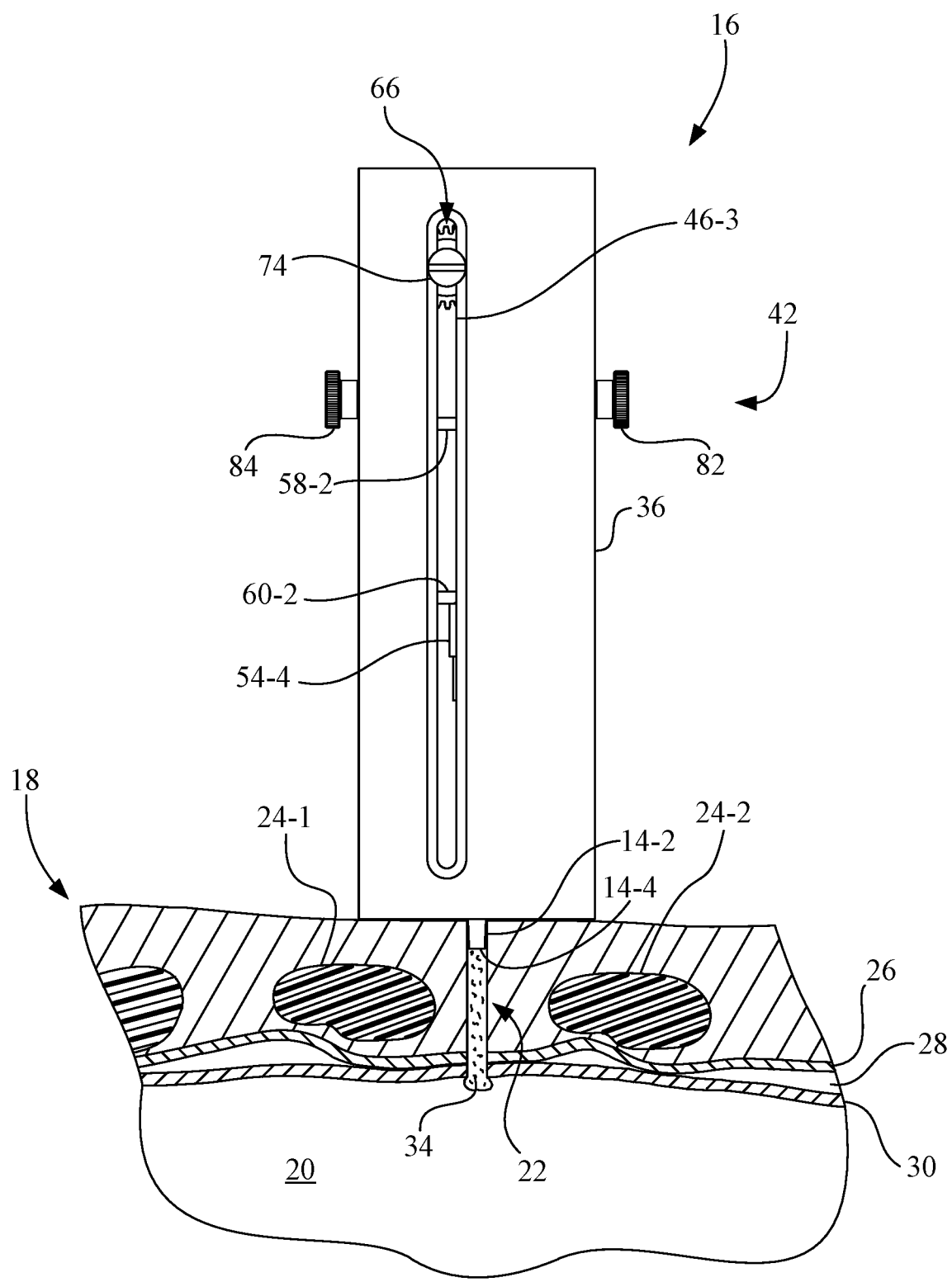
FIG. 2 is a diagrammatic representation of the biopsy system of FIG. 1 in conjunction with a depicted portion of a chest wall and lung of a patient, with the biopsy tract sealant applicator device in a deployed state.

Referring now to the drawings, and more particularly to FIGS. 1 and 2, there is shown a biopsy system 10 which generally includes a biopsy device 12, a biopsy cannula 14, and a biopsy tract sealant applicator device 16 configured in accordance with an embodiment of the present invention. In FIG. 1, the movable components of biopsy tract sealant applicator device 16 are positioned in an armed state. In FIG. 2, the movable components of biopsy tract sealant applicator device 16 are positioned in a deployed state.

Referring to FIG. 1, biopsy system 10 is shown in conjunction with a depicted portion of a chest wall 18 and lung 20 of a patient. Biopsy cannula 14 and biopsy device 12 (or alternatively a trocar) may be used, in combination, to form a biopsy tract 22, i.e., an access passage, to the interior of lung 20. In particular, biopsy tract 22 is formed between adjacent ribs 24-1, 24-2 in the rib cage of chest wall 18, and extends though the parietal pleura 26, the pleural space 28, and the visceral pleura 30 to provide access to the interior of the lung 20. Collectively, parietal pleura 26 and visceral pleura 30 are referred to herein as the pleural layers 26, 30. In FIG. 1, each of biopsy device 12 and biopsy tract sealant applicator device 16 may be sequentially arranged along a centerline axis 32 that longitudinally extends through biopsy cannula 14.

In the present example depicted in FIG. 1, it may be assumed that the biopsy of lung 20 has been completed, wherein a biopsy probe 12-1 (e.g., needle) of biopsy device 12 has been removed from cannula lumen 14-1 of biopsy cannula 14, and with biopsy cannula 14 remaining in position in biopsy tract 22.

Biopsy cannula 14 includes a cannula shaft 14-2 having a proximal end portion 14-3 and a distal end 14-4. Cannula lumen 14-1 extends through mounting hub 14-5 to distal end 14-4, with centerline axis 32 longitudinally extending through cannula lumen 14-1. Proximal end portion 14-3 is fixedly attached to a mounting hub 14-5, which is located external to (i.e., above the external skin) chest wall 18. Distal end 14-4 is positioned to be distal to, i.e., below, the visceral pleura 30, wherein the location of distal end 14-4 of biopsy cannula 14 relative to the pleural layers 26, 30 may be determined and/or confirmed, using an imaging system, such as for example, ultrasound imaging or X-ray imaging.

Following removal of biopsy probe 12-1 of biopsy device 12 from cannula lumen 14-1 of biopsy cannula 14, biopsy tract sealant applicator device 16 may then be connected to mounting hub 14-5 of biopsy cannula 14 via, for example, a Luer-type connection.

Referring also to FIG. 2 depicting the deployed state, biopsy tract sealant applicator device 16 is configured to simultaneously retract biopsy cannula 14 and deliver a flowable sealant material 34, e.g., a flowable hydrogel, through cannula lumen 14-1. More particularly, biopsy tract sealant applicator device 16 may be configured to simultaneously deliver the flowable sealant material 34 to biopsy tract 22 in a suitable volume and rate so as to fill biopsy tract 22 as biopsy cannula 14 is being retracted (i.e. withdrawn) from biopsy tract 22, so as to aid in reducing or preventing pneumothorax. Also, advantageously, in view of the simultaneous cannula retraction/sealant deployment aspects, biopsy tract sealant applicator device 16 aids in reducing or eliminating an over-dispensing of the flowable sealant material 34 into the patient's anatomy, which could result in procedural complications.

In some implementations, the flowable sealant material 34 may be a flowable radiopaque hydrogel that is imageable through x-ray imaging, so as to aid in confirming the placement of the flowable sealant material 34 in biopsy tract 22, if desired.

FIGS. 3-12 show various views of biopsy tract sealant applicator device 16 in an armed state. In the armed state, the various movable components of biopsy tract sealant applicator device 16 are in an extended position 16-1 (see, e.g., FIGS. 4, 5, and 7), e.g., ready to effect a retraction of biopsy cannula 14 and to effect a simultaneous deployment of the deliverable portion of the flowable sealant material 34 carried by biopsy tract sealant applicator device 16, when the movable components of biopsy tract sealant applicator device 16 are released. The extended position 16-1 may be a variable range along the length of biopsy tract sealant applicator device 16, depending upon the amount of flowable sealant material 34 that is to be delivered, and is based upon the initial positioning of the various movable components of biopsy tract sealant applicator device 16.

Optionally, biopsy tract sealant applicator device 16 may be shipped in the armed state, such that biopsy tract sealant applicator device 16 arrives to the user ready for use to deliver a predetermined amount of the flowable sealant material 34, and being ready for connection to mounting hub 14-5 of biopsy cannula 14 (see also FIG. 1). Alternatively, biopsy tract sealant applicator device 16 may be shipped in a disarmed state, wherein the motive force delivery components, e.g., springs, of biopsy tract sealant applicator device 16 are disconnected and/or otherwise disabled, in which case the motive force delivery components, e.g., springs, of biopsy tract sealant applicator device 16 are connected and/or otherwise enabled prior to use.

FIGS. 13-22 show various views of biopsy tract sealant applicator device 16 in a deployed state. In the deployed state, the various movable components of biopsy tract sealant applicator device 16 are in a retracted position 16-2 (see, e.g., FIGS. 14, 15, and 17 (deployed state) in comparison to FIGS. 4, 5, and 7 (armed state)), wherein biopsy tract sealant applicator device 16 has fully retracted biopsy cannula 14 and wherein the deliverable portion of the flowable sealant material 34 initially carried by biopsy tract sealant applicator device 16 (while in the armed state) has been fully deployed, i.e., delivered through distal end 14-4 of biopsy cannula 14, as shown in FIG. 2. It should be recognized that a non-deliverable portion of the flowable sealant material 34 can be retained, at least within a portion of cannula lumen 14-1 of biopsy cannula 14, even after full deployment of the deliverable portion of the flowable sealant material 34.

Figure 3:
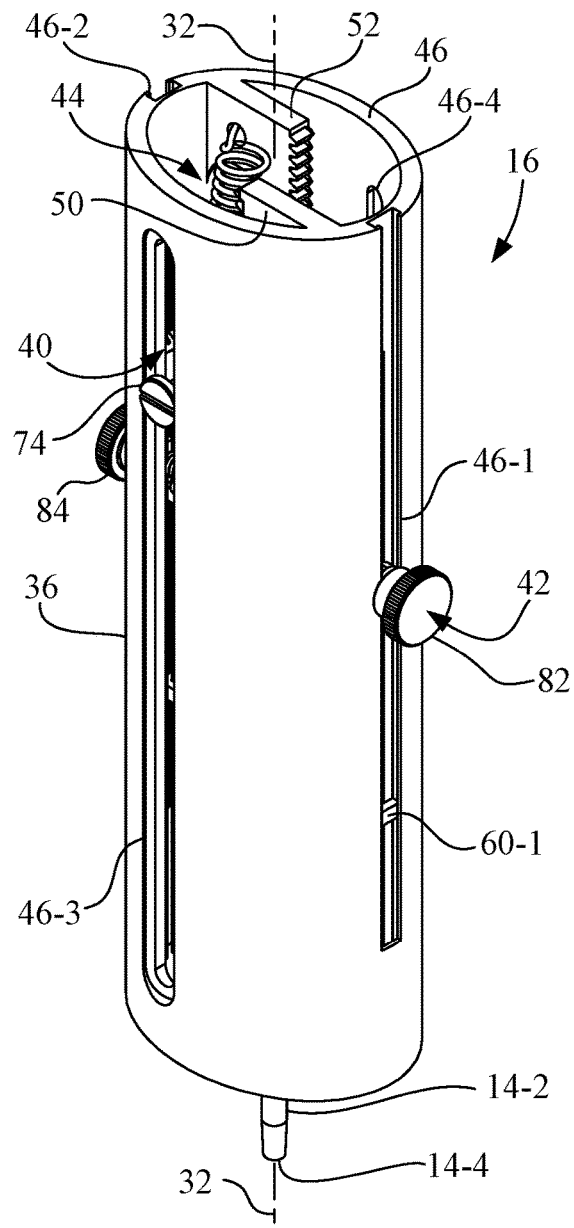
Figure 13:
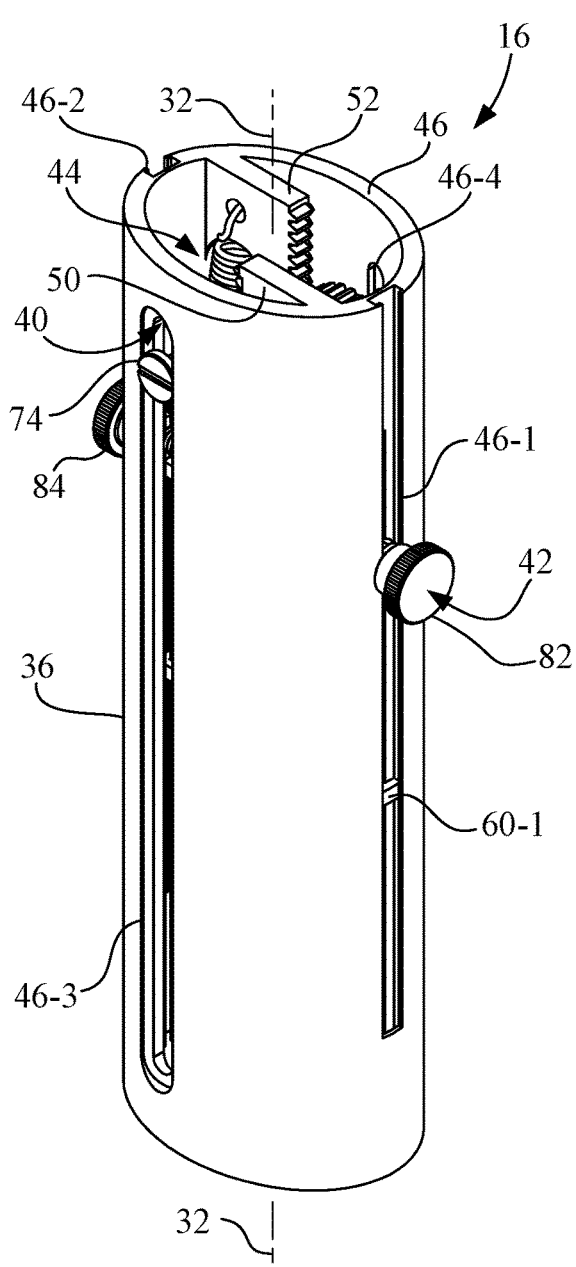
Figure 17:
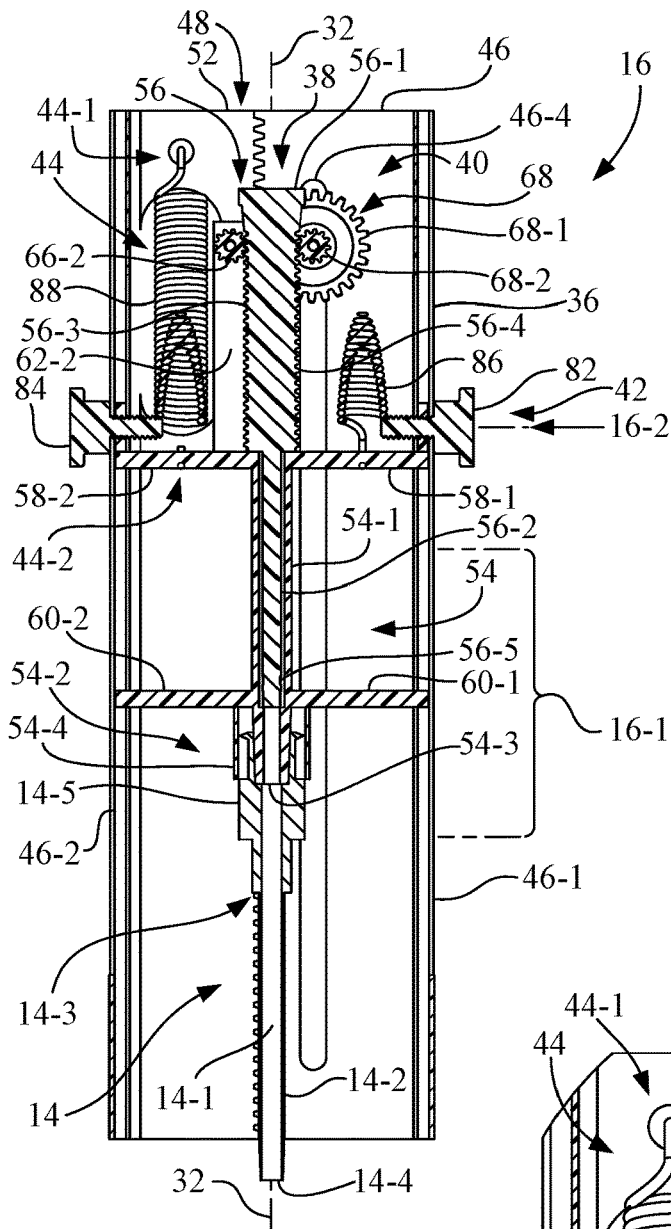
Figure 18:
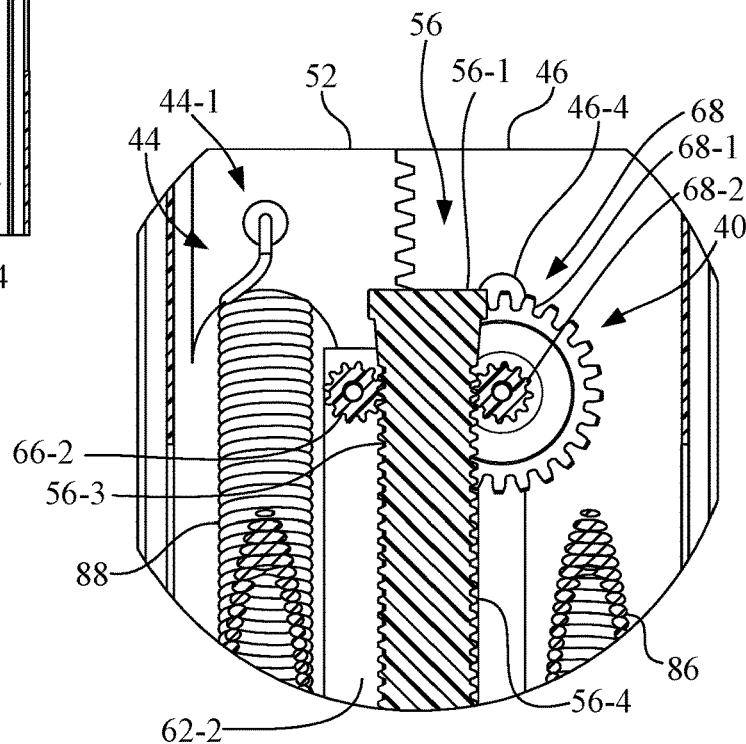
Figure 19:
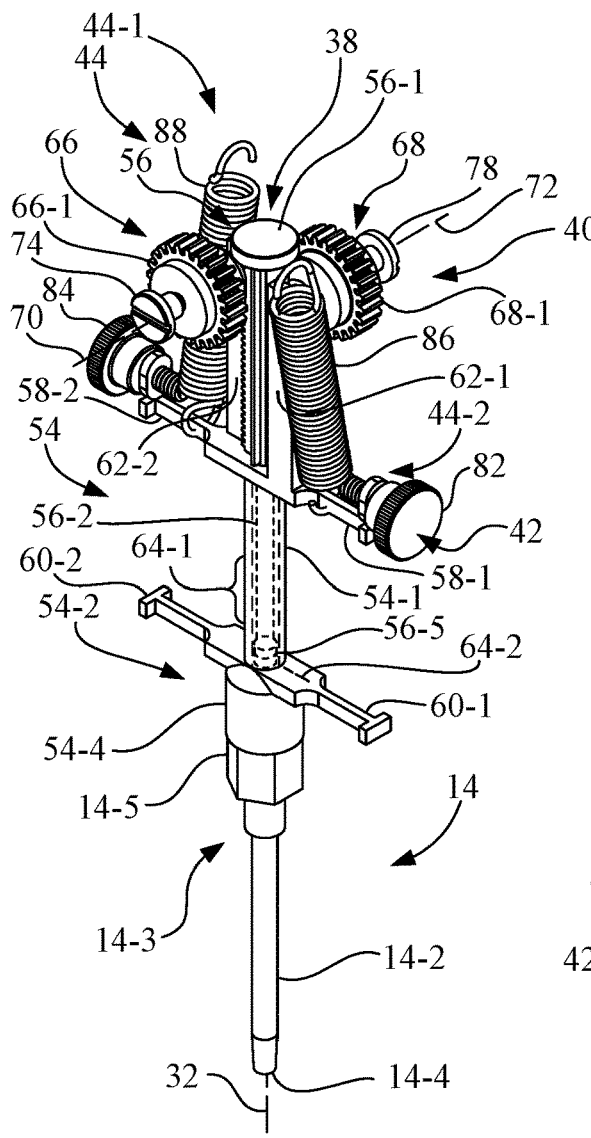
Figure 20:
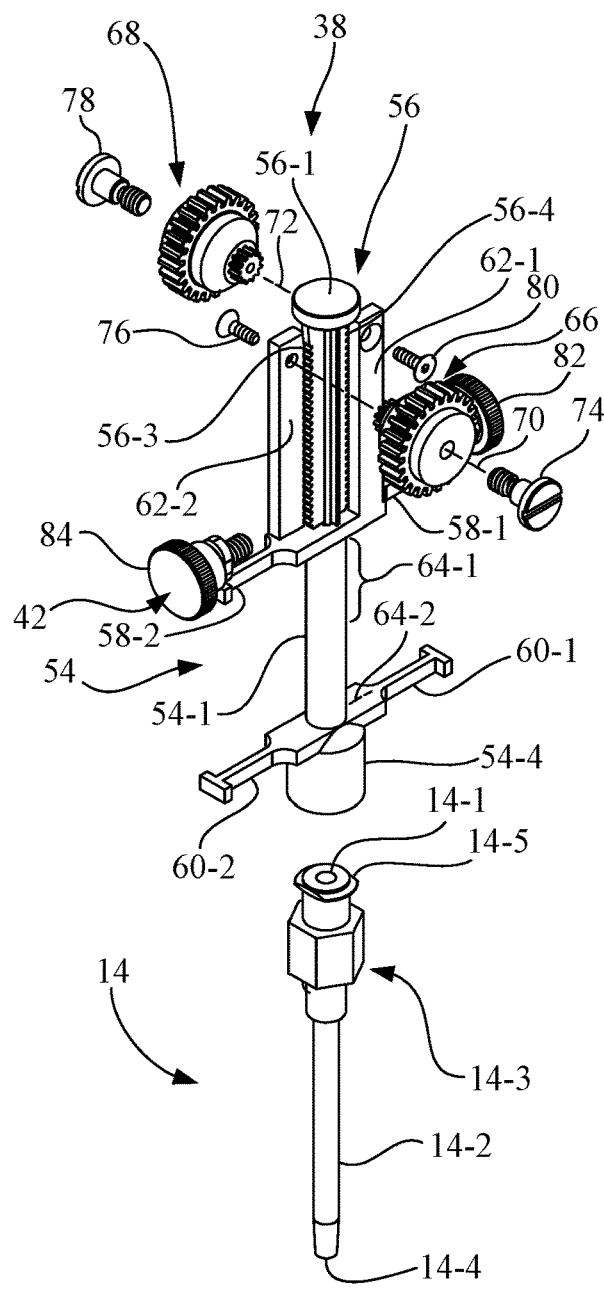

Referring particularly to FIGS. 3, 7, and 9 (armed state) and FIGS. 13, 17, and 19 (deployed state), biopsy tract sealant applicator device 16 includes a housing 36, a syringe 38, a gear train 40, an actuator 42, and a spring unit 44.

Housing 36 has a side wall 46 that defines an interior chamber 48. Housing 36 further includes a first rack gear 50 and a second rack gear 52. In the present embodiment, as best shown in FIGS. 3, 6, 13, and 16, housing 36 and side wall 46 have an elliptical shape in cross-section along centerline axis 32 of housing 36, wherein when viewed endwise, the elliptical curvatures of housing 36 form opposed minor circumferential portions and opposed major circumferential portions. Each of first rack gear 50 and second rack gear 52 is connected to side wall 46 of housing 36 in interior chamber 48, and each of first rack gear 50 and second rack gear 52 is longitudinally oriented in interior chamber 48 along the longitudinal extent of side wall 46. Each of first rack gear 50 and second rack gear 52 may be formed integral with, and project inwardly from, side wall 46 in interior chamber 48. In the present embodiment, first rack gear 50 and second rack gear 52 form a linear stationary portion of gear train 40, wherein first rack gear 50 and second rack gear 52 are attached to side wall 46 in interior chamber 48 of housing 36.

In the present embodiment, first rack gear 50 and second rack gear 52 are non-diametrically opposed and extend inwardly from the respective opposed minor circumferential portions of side wall 46. In other words, in the present embodiment, first rack gear 50 and second rack gear 52 face in opposite directions, and are parallel on opposite sides of the major diameter of housing 36, i.e., are diametrically offset from each other.

Referring particularly to FIGS. 3, 7, 13, and 17, side wall 46 has a first slide channel 46-1 and a second slide channel 46-2. First slide channel 46-1 longitudinally extends in side wall 46 and extends through side wall 46 to interior chamber 48 of housing 36. Second slide channel 46-2 longitudinally extends in side wall 46 and extends through side wall 46 to interior chamber 48 of housing 36. In the present embodiment, second slide channel 46-2 is parallel to first slide channel 46-1, wherein first slide channel 46-1 and second slide channel 46-2 are diametrically opposed across a width of housing 36 in the opposed minor circumferential portions of housing 36.

Figure 4:
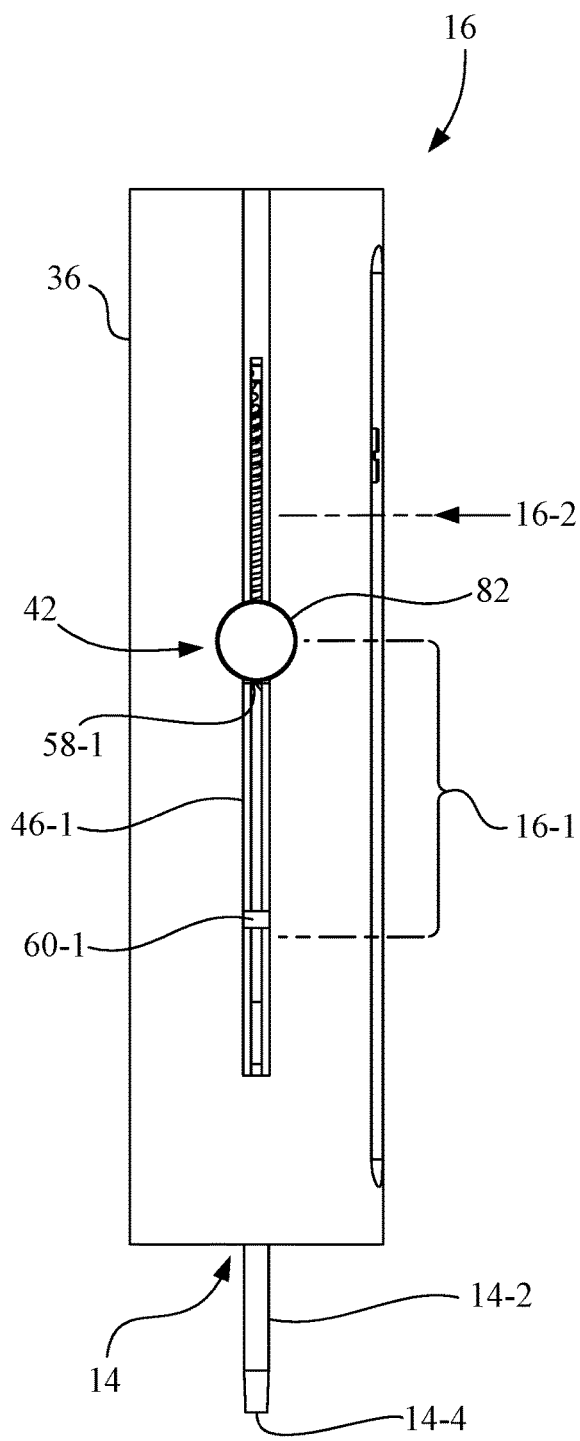
Figure 5:
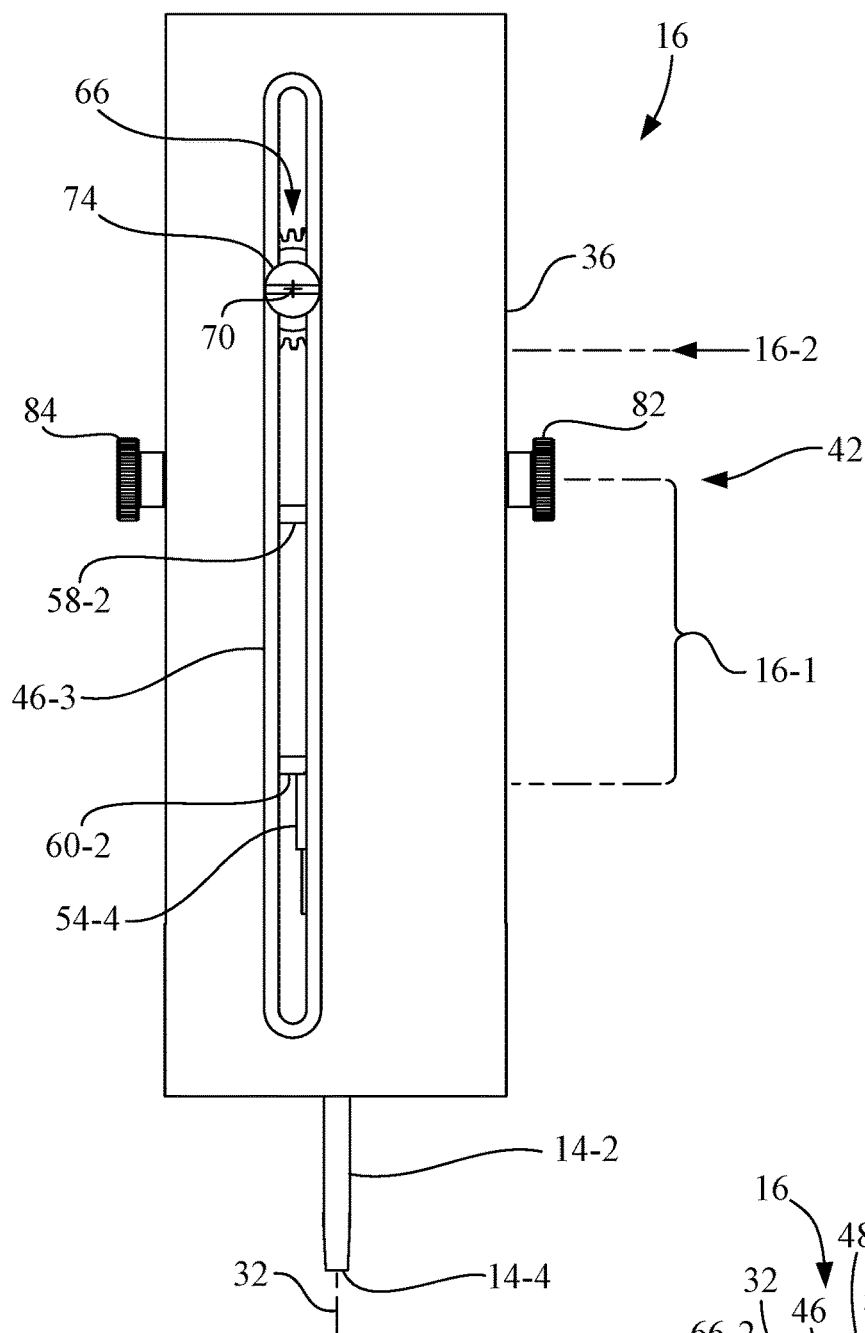
Figure 6:
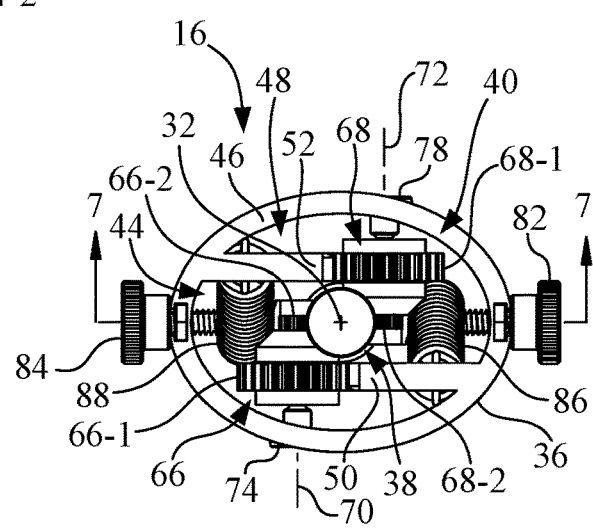
Figure 14:
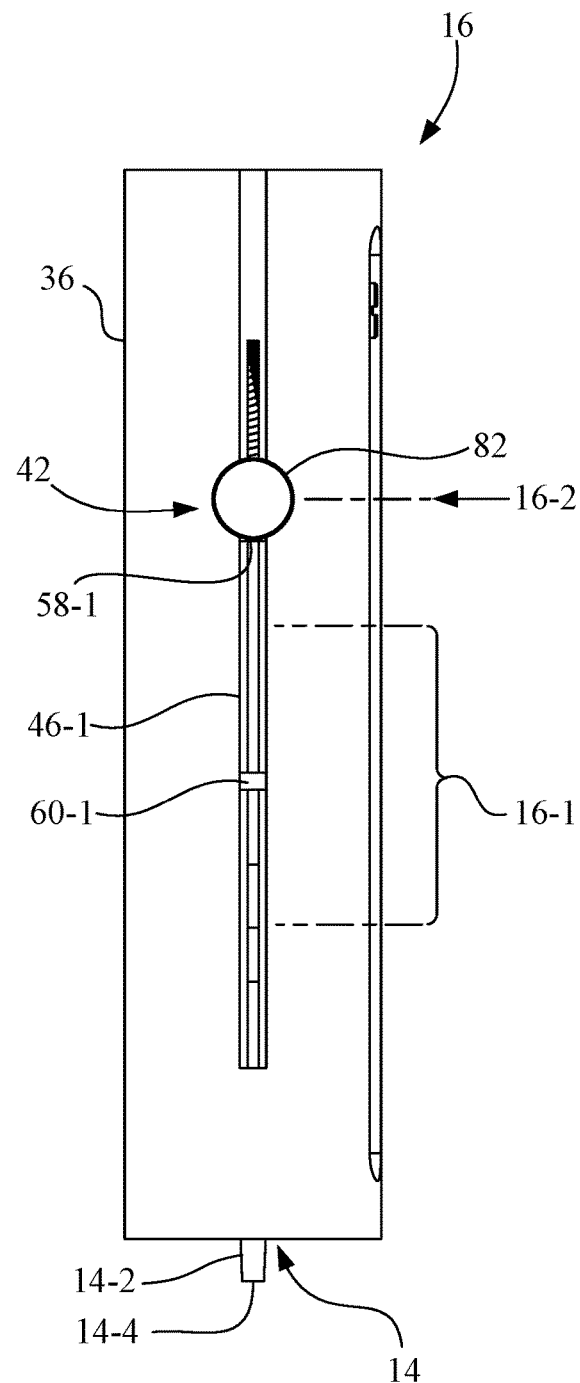
Figure 15:
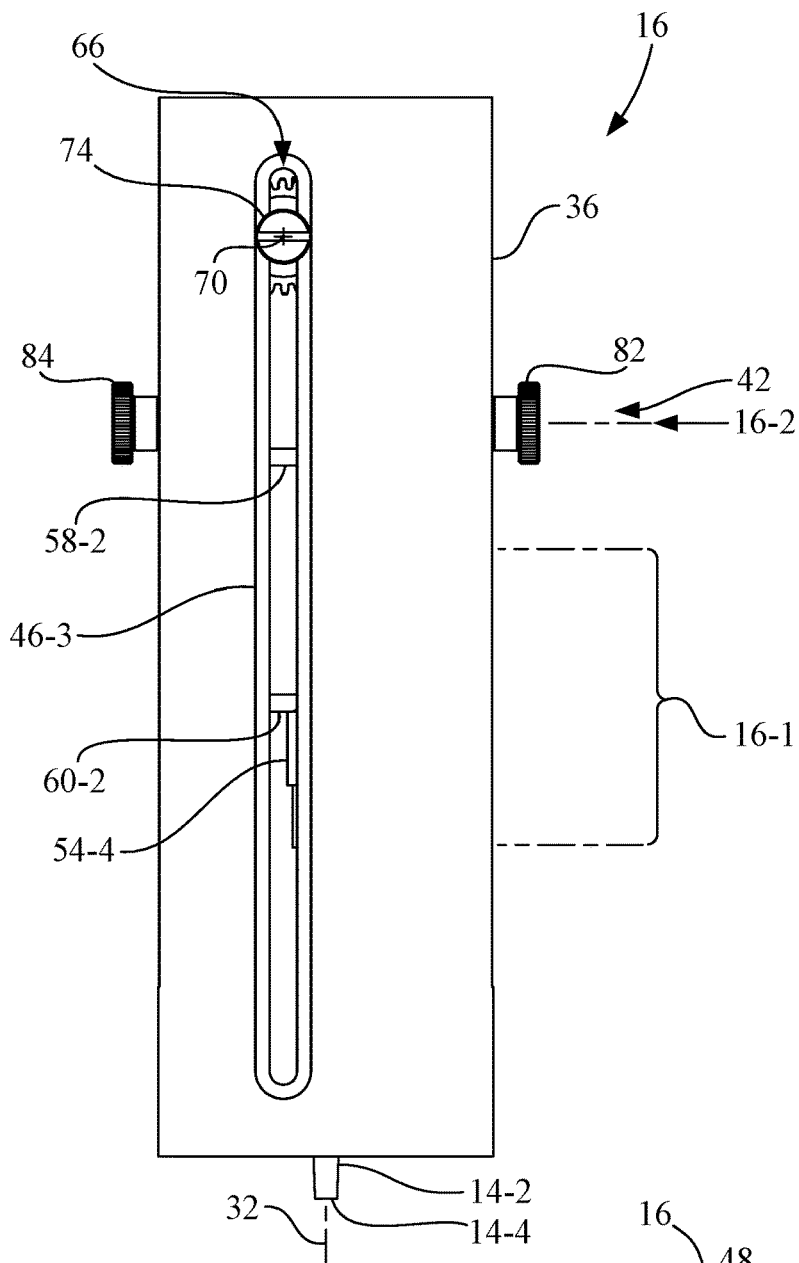
Figure 16:
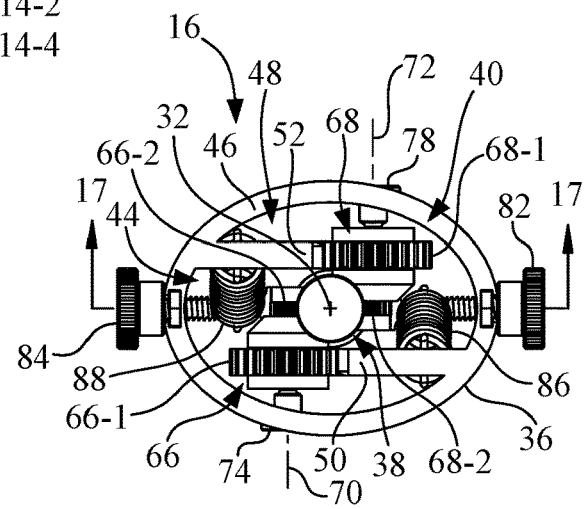

Referring to FIGS. 4, 5, and 7 (armed state) and FIGS. 14, 15, and 17 (deployed state), biopsy tract sealant applicator device 16 has an extended position 16-1 that corresponds to the armed state of biopsy tract sealant applicator device 16 and a retracted position 16-2 that corresponds to the deployed state of biopsy tract sealant applicator device 16. For example, extended position 16-1 and retracted position 16-2 may be defined by a position of actuator 42 (serving as a reference point) along first slide channel 46-1 and second slide channel 46-2. As depicted by a bracket in FIGS. 4, 5, 7, 14, 15, and 17, extended position 16-1 may be a variable range along the length of biopsy tract sealant applicator device 16 so as to selectively accommodate the deployment of less or more of flowable sealant material 34 during deployment.

Side wall 46 also has a third slide channel 46-3 and a fourth slide channel 46-4 configured for slidably mounting a rotary longitudinally positionable portion of gear train 40, as will be described in further detail below. In the present embodiment, third slide channel 46-3 and fourth slide channel 46-4 are located non-diametrically in the opposed major circumferential portions of side wall 46.

Referring to FIGS. 6-12 (armed state) and FIGS. 16-22 (deployed state), syringe 38 is movable within interior chamber 48 of housing 36. Syringe 38 includes a body 54 and a plunger 56. Body 54 includes a first upper guide member 58-1, a second upper guide member 58-2, a first lower guide member 60-1, a second lower guide member 60-2, a first longitudinal arm 62-1, and a second longitudinal arm 62-2. First longitudinal arm 62-1 extends upwardly from first upper guide member 58-1, and second longitudinal arm 62-2 extends upwardly from second upper guide member 58-2.

First upper guide member 58-1 extends outwardly from body 54 of syringe 38 to slidably engage first slide channel 46-1 (see, e.g., FIGS. 3, 4, 7, 13, 14, and 17). Second upper guide member 58-2 extends outwardly from body 54 of syringe 38 to slidably engage second slide channel 46-2 (see, e.g., FIGS. 3, 7, 13, and 17). First lower guide member 60-1 extends outwardly from body 54 of syringe 38 to slidably engage first slide channel 46-1. Second lower guide member 60-2 extends outwardly from body 54 of syringe 38 to slidably engage second slide channel 46-2.

Figures 11, 12:
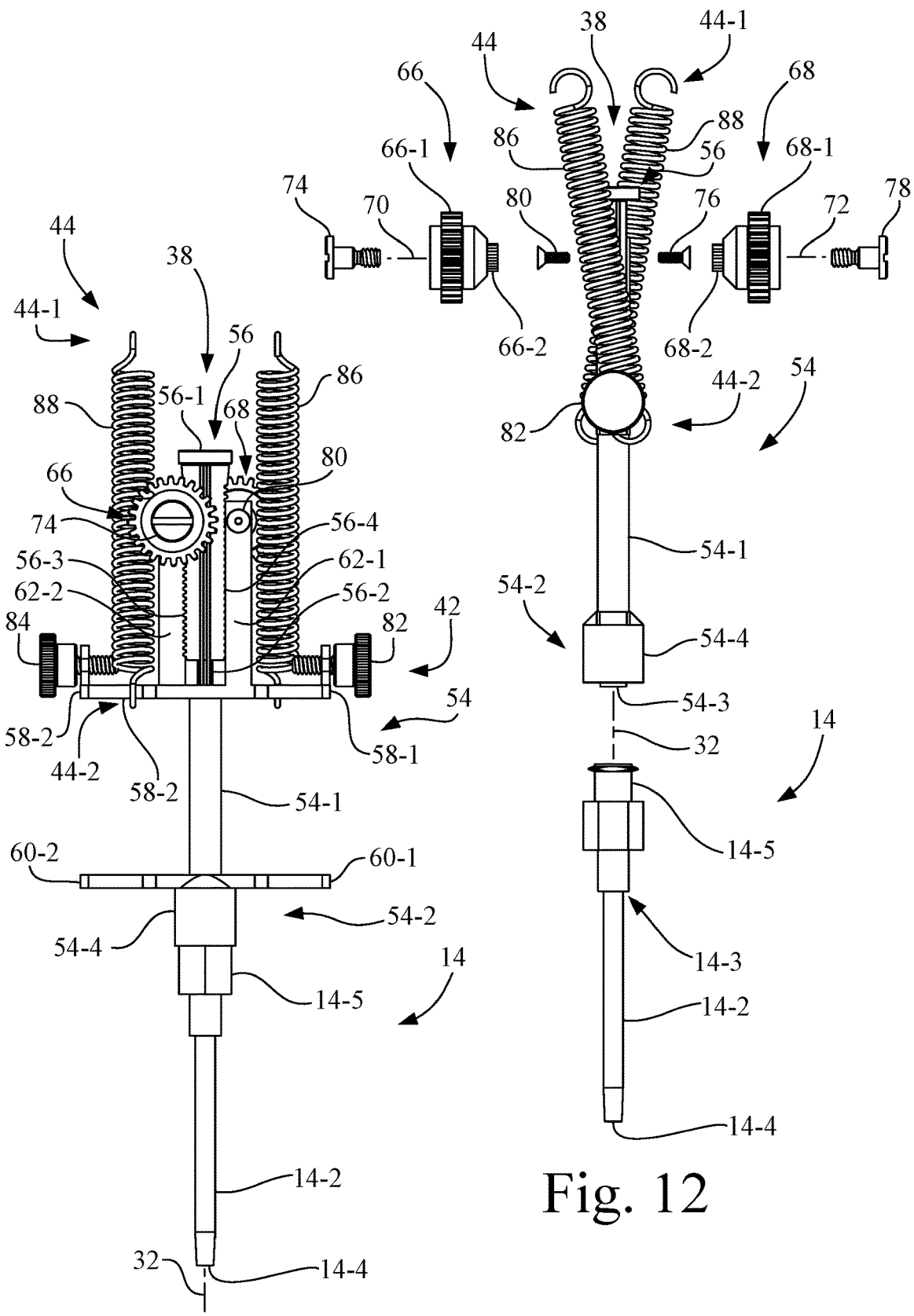
Figures 21, 22:
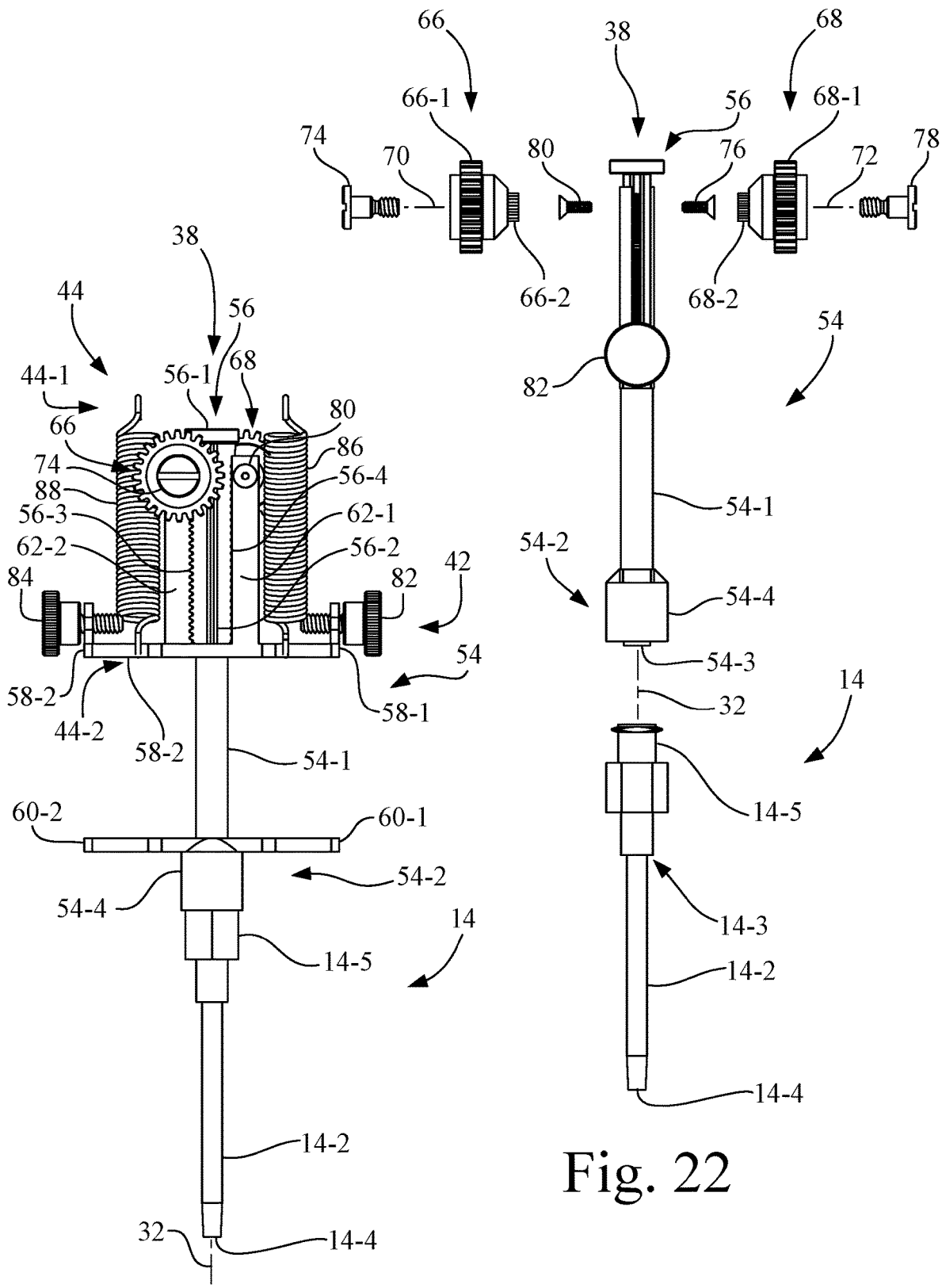

As best shown in FIGS. 7 and 17, body 54 of syringe 38 is slidably coupled to housing 36 in interior chamber 48 via first upper guide member 58-1, second upper guide member 58-2, first lower guide member 60-1, and second lower guide member 60-2. Accordingly, body 54 is movable in interior chamber 48 of housing 36 between extended position 16-1 (i.e., the armed state) and retracted position 16-2 (i.e., the deployed state). Body 54 has a cylinder 54-1, which may more generally be a tube or tubular portion, for carrying the flowable sealant material 34 (see also FIG. 2). Referring particularly to FIGS. 12 and 22, a distal end portion 54-2 of body 54 defines a delivery port 54-3 and a coupler 54-4. Delivery port 54-3 is in fluid communication with cylinder 54-1. Coupler 54-4 of body 54 of syringe 38 is configured, e.g., as a Luer fitting, for connection to mounting hub 14-5 of biopsy cannula 14. Centerline axis 32 of housing 36 extends through the delivery port 54-3 and plunger 56 of syringe 38.

Referring to FIGS. 7-12 and 17-22, plunger 56 of syringe 38 includes a head end 56-1, a shaft portion 56-2, third rack gear 56-3, a fourth rack gear 56-4, and a piston 56-5. Each of third rack gear 56-3 and fourth rack gear 56-4 is formed along a length of shaft portion 56-2 of plunger 56. In the present embodiment, third rack gear 56-3 and fourth rack gear 56-4 form a linear movable portion of gear train 40 (relative to housing 36), wherein third rack gear 56-3 and fourth rack gear 56-4 are attached to opposite sides of shaft portion 56-2 of plunger 56 of syringe 38.

Referring particularly to FIGS. 7, 9, 12, 17, and 19, piston 56-5 is positioned in the cylinder 54-1 proximal to delivery port 54-3, and is movable in the cylinder 54-1 between a proximal position 64-1 and a distal position 64-2 (see FIG. 9). Just as the charged (extended) position 16-1 of body 54 of syringe 38 is a variable range, proximal position 64-1 of piston 56-5 of plunger 56 of syringe 38 is also a variable range. The actual position of proximal position 64-1 of piston 56-5 of plunger 56 of syringe 38 will be determined by the gear ratio of gear train 40 and the predetermined initial position of body 54 in interior chamber 48 of housing 36. The flowable sealant material 34 (see also FIG. 2) is located in cylinder 54-1 of body 54 of syringe 38 between delivery port 54-3 of body 54 (see FIG. 12) and piston 56-5 of plunger 56 of syringe 38 (see FIG. 9). Coupler 54-4 of body 54 may be connected to mounting hub 14-5 of biopsy cannula 14, as shown in FIGS. 9-12 and 19-22.

Referring again to FIGS. 3, 7, 13, and 17, gear train 40 is located in interior chamber 48 of housing 36. Gear train 40 is operatively coupled to each of housing 36, body 54 of syringe 38, and plunger 56 of syringe 38 (see also FIGS. 6, 8-12, 16, and 18-22). Gear train 40 is configured to move plunger 56 from the proximal position 64-1 toward the distal position 64-2 as body 54 is moved from the extended position 16-1 toward the retracted position 16-2 by the biasing force exerted by the spring unit 44. In one implementation, for example, a gear ratio of gear train 40 may be selected to depress plunger 56 toward the distal position 64-2 and retract body 54 toward the retracted position 16-2 at a ratio of about 1:2.25, i.e., a ratio of 1 millimeter movement of plunger 56 of syringe 38 for every 2.25 millimeters of movement of body 54 of syringe 38.

Gear train 40 includes first rack gear 50 connected to housing 36 in interior chamber 48, second rack gear 52 connected to housing 36 in interior chamber 48, third rack gear 56-3 formed along a length of plunger 56, and fourth rack gear 56-4 formed along the length of plunger 56, as described above. In addition, gear train 40 includes a first dual spur gear 66 and a second dual spur gear 68.

First dual spur gear 66 and a second dual spur gear 68 form the rotary portion of gear train 40. As best shown in FIGS. 6, 9-11, 16, and 19-21, first dual spur gear 66 is rotatably engaged with each of first rack gear 50 of housing 36 and third rack gear 56-3 of plunger 56 of syringe 38. Second dual spur gear 68 is rotatably engaged with each of second rack gear 52 of housing 36 and the fourth rack gear 56-4 of plunger 56 of syringe 38.

As best shown in FIGS. 6, 9, 16 and 19, first dual spur gear 66 has a first rotational axis 70, and second dual spur gear 68 has a second rotational axis 72. First rotational axis 70 of first dual spur gear 66 is parallel to second rotational axis 72 of second dual spur gear 68, and centerline axis 36-1 of housing 36 is interposed between the first rotational axis 70 and second rotational axis 72, i.e., first rotational axis 70 and second rotational axis 72 are parallel and non-coaxial.

Referring particularly to FIGS. 12 and 22, first dual spur gear 66 has a first spur gear 66-1 and a second spur gear 66-2, with first spur gear 66-1 having more teeth than the second spur gear 66-2. Second dual spur gear 68 has a first spur gear 68-1 and a second spur gear 68-2, with first spur gear 68-1 having more teeth than the second spur gear 68-2.

Referring to FIGS. 3, 5, 9, 13, 19, and 15, first dual spur gear 66 is slidably and rotatably mounted to side wall 46 of housing 36 via a screw 74 that passes through third slide channel 46-3 of side wall 46 of housing 36 and threadably engages first spur gear 66-1 of first dual spur gear 66. Referring also to FIGS. 11, 12, 21, and 22, first dual spur gear 66 also is rotatably mounted to second longitudinal arm 62-2 of body 54 of syringe 38 via a screw 76 that passes through and threadably engages second spur gear 66-2 of first dual spur gear 66, wherein screw 74 is coaxial with screw 76 along first rotational axis 70 of first dual spur gear 66. In the present embodiment, first dual spur gear 66 is axially retained between side wall 46 of housing 36 and second longitudinal arm 62-2 of body 54 of syringe 38.

Likewise, referring to FIGS. 3, 7-9, 13, and 17-19, second dual spur gear 68 is slidably and rotatably mounted to side wall 46 of housing 36 via a screw 78 that passes through fourth slide channel 46-4 of side wall 46 of housing 36 and threadably engages first spur gear 68-1 of second dual spur gear 68. Referring also to FIGS. 11, 12, 21, and 22, second dual spur gear 68 also is rotatably mounted to first longitudinal arm 62-1 of body 54 of syringe 38 via a screw 80 that passes through and threadably engages second spur gear 68-2 of second dual spur gear 68, wherein screw 78 is coaxial with screw 80 along second rotational axis 72 of second dual spur gear 68. In the present embodiment, second dual spur gear 68 is axially retained between side wall 46 of housing 36 and first longitudinal arm 62-1 of body 54 of syringe 38.

First spur gear 66-1 of first dual spur gear 66 is rotationally engaged with first rack gear 50 of housing 36 (see FIGS. 6 and 16), and second spur gear 66-2 of first dual spur gear 66 is rotationally engaged with third rack gear 56-3 of plunger 56 (see also, FIGS. 11, 12, 21, and 22). Likewise, first spur gear 68-1 of second dual spur gear 68 is rotationally engaged with second rack gear 52 of housing 36 (see FIGS. 6 and 16), and second spur gear 68-2 of second dual spur gear 68 is engaged with fourth rack gear 56-4 of plunger 56 (see also, FIGS. 11, 12, 21, and 22).

Referring to FIGS. 1, 2, 3-7, 11, 13-17, and 21, actuator 42 includes at least one lock member that is configured to hold body 54 of syringe 38 in the extended position 16-1 relative to housing 36 and with spring unit 44 in the charged state. In the present embodiment, actuator 42 includes a first lock member 82 and a second lock member 84, wherein first lock member 82 and second lock member 84 are symmetrically arranged along housing 36. First lock member 82 (e.g., a threaded knob) extends through first slide channel 46-1 of side wall 46 of housing 36 (see FIGS. 3, 4, 6, 13, 14, and 16) and threadably engages a portion of first upper guide member 58-1 (see FIGS. 11 and 21) of body 54 of syringe 38. Likewise, second lock member 84 (e.g., a threaded knob) extends through second slide channel 46-2 of side wall 46 of housing 36 (see FIGS. 3, 6-8, 13, and 16-18) and threadably engages a portion of second upper guide member 58-2 (see FIGS. 11 and 21) of body 54 of syringe 38.

In the present embodiment, lock members 82, 84 are threaded knobs that are exposed on opposite sides of housing 36, e.g., exposed on opposed minor circumferential portions of side wall 46 of housing 36 (see FIGS. 3-7 and 13-17). The lock member 82 (first threaded knob) extends through first slide channel 46-1 of housing 36 and threadably engages first upper guide member 58-1 (see FIGS. 11 and 21), and second lock member 84 (second threaded knob) extends through the second slide channel 46-2 of housing 36 and threadably engages the second upper guide member (see FIGS. 11 and 21), wherein the knobs are configured to compress against housing 36 (when tightened), so as to lock syringe 38 in a pre-determined location in interior chamber 48 of housing 36. In other words, the knobs are tightened against housing 36 to hold the movable components of biopsy tract sealant applicator device 16 in the extended position 16-1 corresponding to an armed state of biopsy tract sealant applicator device 16. Actuator 42 is configured to release the lock members 82, 84, e.g., by manual manipulation (e.g., loosening) of lock members 82, 84 by the user, so that body 54 of syringe 38 may be moved from the extended position 16-1 toward the retracted position 16-2 by the biasing force exerted by the spring unit 44.

Referring to FIGS. 3, 6-12, 13, and 16-22, spring unit 44 is configured to provide the motive force for movement of between the armed state (e.g., extended position 16-1) of biopsy tract sealant applicator device 16 and the deployed state (retracted position 16-2) of biopsy tract sealant applicator device 16. Spring unit 44 has a first end 44-1 and a second end 44-2, wherein first end 44-1 is coupled to housing 36 (e.g., connected to an upper portion of rack gears 50, 52 in a hole-hook arrangement) and second end 44-2 is coupled to body 54 of syringe 38 (e.g., connected to, such as around, lower guide members 60-1, 60-2).

In the present embodiment, referring to FIGS. 6-12 and 16-22, spring unit 44 includes a pair of tension springs 86, 88. While the present embodiment includes multiple tension springs 86, 88, it is contemplated that operation could be effected using a single spring, if desired. In the present embodiment, the pair of tension springs 86, 88 are arranged in interior chamber 48. A first tension spring 86 of the pair of tension springs 86, 88 is connectively interposed between first upper guide member 58-1 of body 54 of syringe 38 and an upper portion of first rack gear 50 of housing 36 in interior chamber 48. A second tension spring 88 of the pair of tension springs 86, 88 is connectively interposed between the second upper guide member 58-2 of body 54 of syringe 38 and an upper portion of second rack gear 52 of housing 36 in interior chamber 48.

Spring unit 44 has a charged state corresponding to extended position 16-1 and a discharged state corresponding to retracted position 16-2. When body 54 of syringe 38 is in the extended position 16-1, the spring unit 44 is in the charged (e.g., extended) state to exert a biasing force on body 54 of syringe 38 in a direction toward the retracted position 16-2. More particularly, in the present embodiment, when body 54 of syringe 38 is in the extended position 16-1, each spring of the pair of tension springs 86, 88 is in a state of tension to bias body 54 toward the retracted position 16-2.

In the present embodiment, in the armed state (see FIGS. 1 and 3-12), lock members 82, 84 (e.g., threaded knobs) compress against housing 36 to lock syringe 38 in a pre-determined location in interior chamber 48 of housing 36. When the knobs are loosened (e.g., as in the deployed state of FIGS. 2 and 13-22), the spring unit 44 provides the motive force to move both body 54 and plunger 56 of syringe 38 at different rates depending upon the gear ratio of gear train 40, so as to dispense the flowable sealant material 34 from delivery port 54-3 of syringe 38, and in turn, to dispense the flowable sealant material 34 from biopsy cannula 14 (see FIG. 2).

Stated differently, in the armed state, lock member(s) 82, 84 of actuator 42 hold body 54 of syringe 38 in the extended position 16-1 relative to housing 36, and with spring unit 44 in the charged state.

Actuator 42 is configured so as to release lock member(s) 82, 84 so that body 54 of syringe 38 is moved from the extended position 16-1 toward the retracted position 16-2 by the biasing force exerted by the spring unit 44, and plunger 56 is moved in the opposite direction, at a rate determined by the gear ratio of gear train 40. As body 54 is moved from the extended position 16-1 toward the retracted position 16-2 (compare FIGS. 7 and 17), biopsy cannula 14 is retracted from biopsy tract 22 in the patient (see FIG. 2). Also, plunger 56 is moved from the proximal position 64-1 toward the distal position 64-2 (see FIG. 9) simultaneously with body 54 being moved from the extended position 16-1 toward the retracted position 16-2, such that the flowable hydrogel is expelled from the delivery port 54-3 of body 54 of syringe 38 and though biopsy cannula 14 into biopsy tract 22 as biopsy cannula 14 is retracted through biopsy tract 22, as depicted in FIG. 2.

In one implementation, the use of biopsy tract sealant applicator device 16 may begin with leaving biopsy cannula 14 in biopsy tract 44 with the distal end 44-4 of biopsy cannula 14 being distal to the pleural layers 26, 30, as depicted in FIG. 1. Referring to FIGS. 9-12 and 19-22, coupler 54-4 of body 54 of syringe 38 of biopsy tract sealant applicator device 16 is connected, e.g., as a Luer fitting, to mounting hub 14-5 of biopsy cannula 14, with tension springs 86, 88 unattached, such that biopsy tract sealant applicator device 16 is not yet in an armed state. Once connected, referring to FIGS. 1 and 3-12), syringe 38 is positioned to the desired position in housing 36, and the lock members 82, 84 (knobs) of actuator 42 are tighten. Tension springs 86, 88 are then attached, in a state of tension, to achieve the armed state, and biopsy tract sealant applicator device 16 is now primed for use. Referring to FIGS. 2 and 13-22, by loosening lock members 82, 84 (knobs) of actuator 42, biopsy tract sealant applicator device 16 is activated, and begins to retract biopsy cannula 14 from biopsy tract 22 while simultaneously deploying the flowable sealant material 34 into biopsy tract 22.

In one implementation, for example, it may be estimated that the largest volume of the flowable sealant material 34 needed is, for example, 0.111 cubic centimeters (cc) based on a determination the biopsy tract 22 is formed by a 17 gauge biopsy cannula 14 and biopsy tract 22 is 20 mm long. Knowing this, it can be determined how much plunger throw is needed for plunger 56 of syringe 38 having a given diameter, e.g., having a 2 mm diameter. The gears of gear train 40 work in sync to ensure that the flowable sealant material 34 is dispensed appropriately as biopsy cannula 14 is removed.

Once biopsy tract sealant applicator device 16 is engaged with biopsy cannula 14 (already in the patient), actuator 42 activates spring unit 44 to pull syringe 38, and in turn biopsy cannula 14, away from the patient. The gears of gear train 40 activate and depress plunger 56, e.g., at a rate of approximately 1:2.25 (e.g., for every 2.25 mm syringe 38 is pulled away from the patient, plunger 56 pushes 1 mm into syringe 38), thereby dispensing the appropriate amount of the flowable sealant material 34 for this size tract into biopsy tract 22.

The following items also relate to the invention:

In one form, the invention relates to a biopsy tract sealant applicator device for connection to a mounting hub of a biopsy cannula. The biopsy tract sealant applicator device comprises a housing that may have an interior chamber, a syringe that has a body and a plunger, a spring unit that has a first end and a second end, and a gear train located in the interior chamber of the housing. The body of the syringe may be slidably coupled to the housing in the interior chamber. The body may be configured to move in the interior chamber of the housing between an extended position and a retracted position. The body may have a cylinder (which may more generally be a tube or tubular portion) and a distal end portion that defines a delivery port and a coupler. The delivery port is in fluid communication with the cylinder. The coupler may be configured for connection to the mounting hub of the biopsy cannula. The plunger may have a piston positioned in the cylinder proximal to the delivery port and may be configured to move in the cylinder between a proximal position and a distal position. The first end of the spring unit may be coupled to the body of the syringe and the second end of the spring unit may be coupled to the housing. The spring unit has a charged state and a discharged state, wherein when the body is in the extended position the spring unit is in the charged state to exert a biasing force on the body of the syringe in a direction toward the retracted position. The gear train may be operatively coupled to each of the housing, the body of the syringe, and the plunger of the syringe. The gear train may be configured to move the plunger from the proximal position toward the distal position as the body is moved from the extended position toward the retracted position by the biasing force exerted by the spring unit.

Optionally, a gear ratio of the gear train may be selected to depress the plunger of the syringe toward the distal position and retract the body of the syringe toward the retracted position at a ratio of about 1:2.25.

In any of the embodiments, the housing may include a side wall that may have a first slide channel and a second slide channel, wherein the first slide channel longitudinally extends in the side wall and extends through the side wall to the interior chamber of the housing, and the second slide channel longitudinally extends in the side wall and extends through the side wall to the interior chamber of the housing, the second slide channel may be parallel to the first slide channel. The syringe may include a first upper guide member that extends outwardly from the body of the syringe to slidably engage the first slide channel, and a second upper guide member that extends outwardly from the body of the syringe to slidably engage the second slide channel.

Optionally, the syringe may include a first lower guide member that extends outwardly from the body of the syringe to slidably engage the first slide channel, and a second lower guide member that extends outwardly from the body of the syringe to slidably engage the second slide channel.

In any of the embodiments, the biopsy tract sealant applicator device may further comprise an actuator that includes a lock member that may be configured to hold the body of the syringe in the extended position relative to the housing and with the spring unit in the charged state. The actuator may be configured to release the lock member so that the body of the syringe may be moved from the extended position toward the retracted position by the biasing force exerted by the spring unit.

In any of the embodiments, a flowable sealant material may be located in the cylinder of the body of the syringe between the delivery port of the body and the piston of the plunger of the syringe. In embodiments that include the actuator, the actuator may include at least one lock member to lock the syringe in a pre-determined location in the interior chamber of the housing, and may be configured such that when the lock member is released, the spring unit moves both the body and the plunger of the syringe so as to dispense the flowable sealant material.

In embodiments that include the actuator, the actuator may include a lock member that may be configured to hold the body in the extended position relative to the housing and with the spring unit in the charged state, wherein the actuator may be configured to release the lock member so that the body may be moved from the extended position toward the retracted position by the biasing force exerted by the spring unit. The lock member may be, for example, a first threaded knob and a second threaded knob, wherein the first threaded knob extends through the first slide channel of the side wall of the housing and threadably engages the first upper guide member, and wherein the second threaded knob extends through the second slide channel of the side wall of the housing and threadably engages the second upper guide member.

In any of the embodiments, optionally the spring unit may include a pair of tension springs, and when the body is in the extended position, the pair of tension springs is in a state of tension to bias the body toward the retracted position.

In any of the embodiments, a flowable hydrogel may be located in the cylinder of the body of the syringe between the delivery port of the body and the piston of the plunger of the syringe.

Some embodiments may include the flowable hydrogel, wherein the flowable hydrogel may be radiopaque.

In some embodiments, the coupler of the body may be connected to the mounting hub of the biopsy cannula, and wherein the biopsy tract sealant applicator device may be configured such that as the body of the syringe is moved from the extended position to the retracted position the biopsy cannula is simultaneously retracted, and the plunger of the syringe is moved from the proximal position to the distal position simultaneously with the body of the syringe being moved from the extended position to the retracted position, such that the flowable hydrogel may be expelled from the delivery port of the body of the syringe and though the biopsy cannula as the biopsy cannula is retracted.

In some embodiments, the gear train may include a first rack gear connected to the housing in the interior chamber, a second rack gear connected to the housing in the interior chamber, a third rack gear formed along a length of the plunger of the syringe, a fourth rack gear formed along the length of the plunger of the syringe, a first dual spur gear engaged with each of the first rack gear of the housing and the third rack gear of the plunger of the syringe, and a second dual spur gear engaged with each of the second rack gear of the housing and the fourth rack gear of the plunger of the syringe.

In the gear train described in the preceding paragraph, the housing may have a centerline axis that extends through the delivery port and the plunger of the syringe, the first dual spur gear has a first rotational axis, and the second dual spur gear has a second rotational axis, wherein the first rotational axis may be parallel to the second rotational axis, and the centerline axis of the housing may be interposed between the first rotational axis and the second rotational axis.

In embodiments that have the gear train configured with the first and second dual spur gears, each of the first dual spur gear and the second dual spur gear may have a first spur gear and a second spur gear, wherein the first spur gear may have more teeth than the second spur gear. The first spur gear of the first dual spur gear may be engaged with the first rack gear of the housing. The second spur gear of the first dual spur gear may be engaged with the third rack gear of the plunger of the syringe. The first spur gear of the second dual spur gear may be engaged with the second rack gear of the housing. The second spur gear of the second dual spur gear may be engaged with the fourth rack gear of the plunger of the syringe.

Some embodiments may have the spring unit that includes the pair of tension springs and wherein the body of the syringe includes the first upper guide member and the second upper guide member. The pair of tension springs may be arranged in the interior chamber of the housing, wherein the first tension spring of the pair of tension springs may be connectively interposed between the first upper guide member and the housing in the interior chamber and a second tension spring of the pair of tension springs may be connectively interposed between the second upper guide member and the housing in the interior chamber.

In another form, the invention relates to a biopsy system. The biopsy system includes a biopsy cannula, a biopsy device, and a biopsy tract sealant applicator device. The biopsy cannula may have a cannula lumen and a mounting hub. The biopsy device may have a biopsy probe configured to be received through the cannula lumen of the biopsy cannula. The biopsy tract sealant applicator device may be configured for connection to the mounting hub of the biopsy cannula after the biopsy probe is removed from the cannula lumen of the biopsy cannula. The biopsy tract sealant applicator device may comprise a housing, a syringe, a spring unit, and a gear train. The housing has an interior chamber. The syringe may have a body and a plunger, wherein the body may be slidably coupled to the housing in the interior chamber. The body may be configured to move in the interior chamber of the housing between an extended position and a retracted position. The body may have a cylinder and a distal end portion that defines a delivery port and a coupler. The delivery port may be in fluid communication with the cylinder. The coupler may be configured for connection to the mounting hub of the biopsy cannula. The plunger may have a piston positioned in the cylinder proximal to the delivery port and may be configured to move in the cylinder between a proximal position and a distal position. The spring unit may have a first end and a second end. The first end may be coupled to the body of the syringe and the second end may be coupled to the housing. The spring unit may have a charged state and a discharged state, wherein when the body is in the extended position the spring unit is in the charged state to exert a biasing force on the body of the syringe in a direction toward the retracted position. The gear train may be located in the interior chamber of the housing. The gear train may be operatively coupled to each of the housing, the body of the syringe, and the plunger of the syringe. The gear train may be configured to simultaneously move the plunger of the syringe from the proximal position toward the distal position as the body of the syringe is moved from the extended position toward the retracted position by the biasing force exerted by the spring unit.

In the embodiment of the preceding paragraph, a flowable sealant material may be located in the cylinder of the body of the syringe between the delivery port of the body and the piston of the plunger of the syringe. In some embodiments, at least one lock member may be configured to lock the syringe in a pre-determined location in the interior chamber of the housing, and may be configured such that when the lock member is released, the spring unit moves both the body and the plunger of the syringe so as to dispense the flowable sealant material.

In any of the embodiments of the system, the gear train may include a first rack gear connected to the housing in the interior chamber, a second rack gear connected to the housing in the interior chamber, a third rack gear formed along a length of the plunger of the syringe, a fourth rack gear formed along the length of the plunger of the syringe, a first dual spur gear engaged with each of the first rack gear of the housing and the third rack gear of the plunger of the syringe, and a second dual spur gear engaged with each of the second rack gear of the housing and the fourth rack gear of the plunger of the syringe.

In any of the embodiments of the system, the biopsy tract sealant applicator device may comprise an actuator that includes a lock member that may be configured to hold the body of the syringe in the extended position relative to the housing and with the spring unit in the charged state. The actuator may be configured to release the lock member so that the body of the syringe may be moved from the extended position toward the retracted position by the biasing force exerted by the spring unit.

In any of the embodiments of the system, the housing of the biopsy tract sealant applicator device may include a side wall that may have a first slide channel and a second slide channel, wherein the first slide channel longitudinally extends in the side wall and extends through the side wall to the interior chamber of the housing, and the second slide channel longitudinally extends in the side wall and extends through the side wall to the interior chamber of the housing. The second slide channel may be parallel to the first slide channel. The syringe may include a first guide member that extends outwardly from the body of the syringe to slidably engage the first slide channel, and a second guide member that extends outwardly from the body of the syringe to slidably engage the second slide channel. The spring unit may include a pair of tension springs, wherein the pair of tension springs may be arranged in the interior chamber. A first tension spring of the pair of tension springs may be connectively interposed between the first guide member and the housing in the interior chamber, and a second tension spring of the pair of tension springs may be connectively interposed between the second guide member and the housing in the interior chamber.

As used herein, words of degree are relative modifiers intended to indicate permissible variation from the characteristic so modified. It is not intended to be limited to the absolute value or characteristic which it modifies but rather possessing more of the physical or functional characteristic than its opposite, and approaching or approximating such a physical or functional characteristic.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A biopsy tract sealant applicator device for connection to a mounting hub of a biopsy cannula, comprising:
   a housing having an interior chamber;
   a syringe having a body and a plunger,
   the body being slidably coupled to the housing in the interior chamber, the body configured to move in the interior chamber of the housing between an extended position and a retracted position, the body having a cylinder and a distal end portion that defines a delivery port and a coupler, the delivery port being in fluid communication with the cylinder, the coupler being configured for connection to the mounting hub of the biopsy cannula,
   the plunger having a piston positioned in the cylinder proximal to the delivery port and configured to move in the cylinder between a proximal position and a distal position;
   a spring unit having a first end and a second end, the first end being coupled to the body of the syringe and the second end being coupled to the housing, the spring unit having a charged state and a discharged state, wherein when the body is in the extended position the spring unit is in the charged state to exert a biasing force on the body of the syringe in a direction toward the retracted position; and
   a gear train located in the interior chamber of the housing, the gear train being operatively coupled to each of the housing, the body of the syringe, and the plunger of the syringe, the gear train configured to move the plunger from the proximal position toward the distal position as the body is moved from the extended position toward the retracted position by the biasing force exerted by the spring unit.

2. The device according to claim 1, wherein a gear ratio of the gear train is selected to depress the plunger of the syringe toward the distal position and retract the body of the syringe toward the retracted position at a ratio of about 1:2.25.

3. The device according to claim 1, wherein:
   the housing includes a side wall having a first slide channel and a second slide channel, wherein the first slide channel longitudinally extends in the side wall and extends through the side wall to the interior chamber of the housing, and the second slide channel longitudinally extends in the side wall and extends through the side wall to the interior chamber of the housing, the second slide channel being parallel to the first slide channel; and
   the syringe includes:
   a first upper guide member that extends outwardly from the body of the syringe to slidably engage the first slide channel; and
   a second upper guide member that extends outwardly from the body of the syringe to slidably engage the second slide channel.

4. The device according to claim 3, wherein the syringe includes:
   a first lower guide member that extends outwardly from the body of the syringe to slidably engage the first slide channel; and
   a second lower guide member that extends outwardly from the body of the syringe to slidably engage the second slide channel.

5. The device according to claim 3, further comprising an actuator including a lock member that is configured to hold the body in the extended position relative to the housing and with the spring unit in the charged state, the actuator configured to release the lock member so that the body is moved from the extended position toward the retracted position by the biasing force exerted by the spring unit, wherein the lock member is a first threaded knob and a second threaded knob, wherein the first threaded knob extends through the first slide channel and threadably engages the first upper guide member, and wherein the second threaded knob extends through the second slide channel and threadably engages the second upper guide member.

6. The device according to claim 3, wherein the spring unit includes a pair of tension springs, wherein the pair of tension springs are arranged in the interior chamber, wherein a first tension spring of the pair of tension springs is connectively interposed between the first upper guide member and the housing in the interior chamber and a second tension spring of the pair of tension springs is connectively interposed between the second upper guide member and the housing in the interior chamber.

7. The device according to claim 1, further comprising an actuator including at least one lock member that is configured to hold the body of the syringe in the extended position relative to the housing and with the spring unit in the charged state, the actuator configured to release the at least one lock member so that the body of the syringe is moved from the extended position toward the retracted position by the biasing force exerted by the spring unit.

8. The device according to claim 7, further comprising a flowable sealant material located in the cylinder of the body of the syringe between the delivery port of the body and the piston of the plunger of the syringe, and wherein the actuator includes the at least one lock member to lock the syringe in a pre-determined location in the interior chamber of the housing, and configured such that when the at least one lock member is released, the spring unit moves both the body and the plunger of the syringe so as to dispense the flowable sealant material.

9. The device according to claim 1, comprising a flowable hydrogel located in the cylinder of the body of the syringe between the delivery port of the body and the piston of the plunger of the syringe.

10. The device according to claim 9, wherein the flowable hydrogel is radiopaque.

11. The device according to claim 9, wherein the coupler of the body is connected to the mounting hub of the biopsy cannula, and wherein the device is configured such that:
as the body of the syringe is moved from the extended position to the retracted position the biopsy cannula is simultaneously retracted; and
the plunger of the syringe is moved from the proximal position to the distal position simultaneously with the body of the syringe being moved from the extended position to the retracted position, such that the flowable hydrogel is expelled from the delivery port of the body of the syringe and though the biopsy cannula as the biopsy cannula is retracted.

12. The device according to claim 1, wherein the gear train includes:
a first rack gear connected to the housing in the interior chamber;
a second rack gear connected to the housing in the interior chamber;
a third rack gear formed along a length of the plunger of the syringe;
a fourth rack gear formed along the length of the plunger of the syringe;
a first dual spur gear engaged with each of the first rack gear of the housing and the third rack gear of the plunger of the syringe; and
a second dual spur gear engaged with each of the second rack gear of the housing and the fourth rack gear of the plunger of the syringe.

13. The device according to claim 12, wherein:
the housing has a centerline axis that extends through the delivery port and the plunger of the syringe;
the first dual spur gear has a first rotational axis;
the second dual spur gear has a second rotational axis; and
the first rotational axis is parallel to the second rotational axis, and the centerline axis of the housing is interposed between the first rotational axis and the second rotational axis.

14. The device according to claim 12, wherein each of the first dual spur gear and the second dual spur gear has a first spur gear and a second spur gear, with the first spur gear having more teeth than the second spur gear, wherein:
the first spur gear of the first dual spur gear is engaged with the first rack gear of the housing;
the second spur gear of the first dual spur gear is engaged with the third rack gear of the plunger of the syringe;
the first spur gear of the second dual spur gear is engaged with the second rack gear of the housing; and
the second spur gear of the second dual spur gear is engaged with the fourth rack gear of the plunger of the syringe.

15. A biopsy system, comprising:
a biopsy cannula having a cannula lumen and a mounting hub;
a biopsy device having a biopsy probe configured to be received through the cannula lumen of the biopsy cannula; and
a biopsy tract sealant applicator device configured for connection to the mounting hub of the biopsy cannula after the biopsy probe is removed from the cannula lumen of the biopsy cannula, the biopsy tract sealant applicator device comprising:
a housing having an interior chamber;
a syringe having a body and a plunger,
the body being slidably coupled to the housing in the interior chamber, the body configured to move in the interior chamber of the housing between an extended position and a retracted position, the body having a cylinder and a distal end portion that defines a delivery port and a coupler, the delivery port being in fluid communication with the cylinder, the coupler being configured for connection to the mounting hub of the biopsy cannula,
the plunger having a piston positioned in the cylinder proximal to the delivery port and configured to move in the cylinder between a proximal position and a distal position;
a spring unit having a first end and a second end, the first end being coupled to the body of the syringe and the second end being coupled to the housing, the spring unit having a charged state and a discharged state, wherein when the body is in the extended position the spring unit is in the charged state to exert a biasing force on the body of the syringe in a direction toward the retracted position; and
a gear train located in the interior chamber of the housing, the gear train being operatively coupled to each of the housing, the body of the syringe, and the plunger of the syringe, the gear train configured to simultaneously move the plunger of the syringe from the proximal position toward the distal position as the body of the syringe is moved from the extended position toward the retracted position by the biasing force exerted by the spring unit.

16. The system according to claim 15, further comprising:
a flowable sealant material located in the cylinder of the body of the syringe between the delivery port of the body and the piston of the plunger of the syringe; and
at least one lock member configured to lock the syringe in a pre-determined location in the interior chamber of the housing, and configured such that when the lock member is released, the spring unit moves both the body and the plunger of the syringe so as to dispense the flowable sealant material.

17. The system according to claim 15, wherein the gear train includes:
   a first rack gear connected to the housing in the interior chamber;
   a second rack gear connected to the housing in the interior chamber;
   a third rack gear formed along a length of the plunger of the syringe;
   a fourth rack gear formed along the length of the plunger of the syringe;
   a first dual spur gear engaged with each of the first rack gear of the housing and the third rack gear of the plunger of the syringe; and
   a second dual spur gear engaged with each of the second rack gear of the housing and the fourth rack gear of the plunger of the syringe.

18. The system according to claim 15, further comprising an actuator including a lock member that is configured to hold the body of the syringe in the extended position relative to the housing and with the spring unit in the charged state, the actuator configured to release the lock member so that the body of the syringe is moved from the extended position toward the retracted position by the biasing force exerted by the spring unit.

19. The system according to claim 15, wherein:
   the housing includes a side wall having a first slide channel and a second slide channel, wherein the first slide channel longitudinally extends in the side wall and extends through the side wall to the interior chamber of the housing, and the second slide channel longitudinally extends in the side wall and extends through the side wall to the interior chamber of the housing, the second slide channel being parallel to the first slide channel;
   the syringe includes a first guide member that extends outwardly from the body of the syringe to slidably engage the first slide channel, and a second guide member that extends outwardly from the body of the syringe to slidably engage the second slide channel; and
   the spring unit includes a pair of tension springs, wherein the pair of tension springs are arranged in the interior chamber, wherein a first tension spring of the pair of tension springs is connectively interposed between the first guide member and the housing in the interior chamber and a second tension spring of the pair of tension springs is connectively interposed between the second guide member and the housing in the interior chamber.

20. A biopsy tract sealant applicator device for connection to a mounting hub of a biopsy cannula, comprising:
   a housing having an interior chamber;
   a syringe having a body and a plunger,
   the body being slidably coupled to the housing in the interior chamber, the body configured to move in the interior chamber of the housing between an extended position and a retracted position, the body having a cylinder and a distal end portion that defines a delivery port and a coupler, the delivery port being in fluid communication with the cylinder, the coupler being configured for connection to the mounting hub of the biopsy cannula,
   the plunger having a piston positioned in the cylinder proximal to the delivery port and configured to move in the cylinder between a proximal position and a distal position;
   a spring unit having a first end and a second end, the first end being coupled to the body of the syringe and the second end being coupled to the housing, the spring unit having a charged state and a discharged state, wherein when the body is in the extended position the spring unit is in the charged state to exert a biasing force on the body of the syringe in a direction toward the retracted position, and the spring unit includes a pair of tension springs, wherein when the body is in the extended position the pair of tension springs are in a state of tension to bias the body toward the retracted position; and
   a gear train located in the interior chamber of the housing, the gear train being operatively coupled to each of the housing, the body of the syringe, and the plunger of the syringe, the gear train configured to move the plunger from the proximal position toward the distal position as the body is moved from the extended position toward the retracted position by the biasing force exerted by the spring unit.

\* \* \* \* \*